(12) United States Patent
Hiramatsu et al.

(10) Patent No.: US 11,496,631 B2
(45) Date of Patent: Nov. 8, 2022

(54) MEASUREMENT APPARATUS, INFORMATION PROCESSING APPARATUS, AND NON-TRANSITORY COMPUTER READABLE MEDIUM STORING PROGRAM COMPRISING A PROCESSOR THAT CONTROLS THE LIGHT IRRADIATOR THAT INCLUDES A FIRST LIGHT SOURCE ROW AND A SECOND LIGHT SOURCE ROW HAVING DIFFERENT POSITIONS AND COVERING A MAJORITY OF A READING UNIT, A THIRD LIGHT SOURCE AND A FOURTH LIGHT SOURCE HAVING DIFFERENT POSITIONS IN THE INTERSECTING DIRECTION

(71) Applicant: FUJIFILM Business Innovation Corp., Tokyo (JP)

(72) Inventors: Takashi Hiramatsu, Kanagawa (JP); Jungo Harigai, Kanagawa (JP); Hirokazu Ichikawa, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/324,061

(22) Filed: May 18, 2021

(65) Prior Publication Data
US 2022/0124205 A1 Apr. 21, 2022

(30) Foreign Application Priority Data
Oct. 19, 2020 (JP) .............................. JP2020-175380

(51) Int. Cl.
*H04N 1/028* (2006.01)
*H04N 1/00* (2006.01)

(52) U.S. Cl.
CPC ..... *H04N 1/00034* (2013.01); *H04N 1/00018* (2013.01); *H04N 1/00087* (2013.01);
(Continued)

(58) Field of Classification Search
CPC .......... H04N 1/00018; H04N 1/00034; H04N 1/00087; H04N 1/00819; H04N 1/02815;
(Continued)

(56) References Cited

U.S. PATENT DOCUMENTS 9,222,882 B2 12/2015 Hirabayashi et al.
2005/0213167 A1* 9/2005 Shiraishi ............ H04N 1/02895
358/474

(Continued)

FOREIGN PATENT DOCUMENTS

JP 2007281791 A * 10/2007
JP 2008219176 A * 9/2008
(Continued)

*Primary Examiner* — Chad Dickerson
(74) *Attorney, Agent, or Firm* — JCIPRNET

(57) ABSTRACT

A measurement apparatus includes a light irradiator that irradiates a measurement target with light and a processor that controls the light irradiator, in which the processor is configured to irradiate a specific place of the measurement target with the light from plural places having different positions in one direction, and irradiate the specific place of the measurement target with the light from the plural places having different positions in a direction intersecting the one direction.

11 Claims, 20 Drawing Sheets

(52) U.S. Cl.
CPC ..... *H04N 1/00819* (2013.01); *H04N 1/02815* (2013.01); *H04N 1/02885* (2013.01)

(58) Field of Classification Search
CPC ......... H04N 1/02885; B41J 2/45; B41J 2/473; G03G 15/04072; G03G 2215/0404
USPC ................................ 358/409, 406, 509, 474
See application file for complete search history.

(56) References Cited

U.S. PATENT DOCUMENTS

| | | | |
|---|---|---|---|
| 2007/0205355 A1* | 9/2007 | Kikuchi ................ | H04N 1/203 250/234 |
| 2009/0021570 A1* | 1/2009 | Motoyama ................ | B41J 2/45 347/129 |
| 2010/0315691 A1* | 12/2010 | Nishio ............... | H04N 1/00076 358/475 |
| 2020/0342629 A1* | 10/2020 | Kuwada .................... | G06T 7/44 |
| 2021/0302154 A1* | 9/2021 | Hiramatsu ......... | G01N 21/8851 |

FOREIGN PATENT DOCUMENTS

| | | |
|---|---|---|
| JP | 2014240830 | 12/2014 |
| JP | 2017134561 | 8/2017 |
| JP | 2019105656 | 6/2019 |

\* cited by examiner

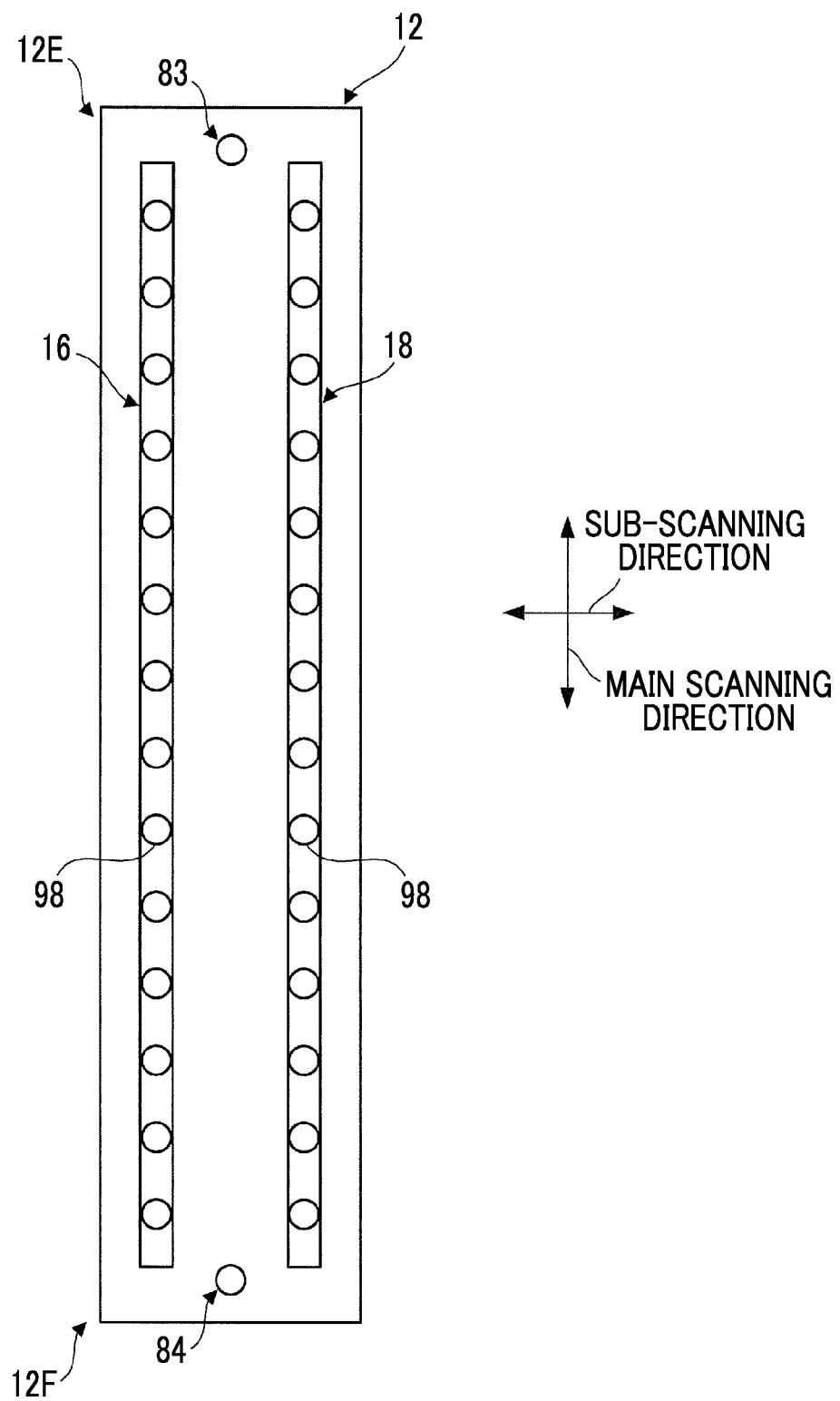

MEASUREMENT APPARATUS, INFORMATION PROCESSING APPARATUS, AND NON-TRANSITORY COMPUTER READABLE MEDIUM STORING PROGRAM COMPRISING A PROCESSOR THAT CONTROLS THE LIGHT IRRADIATOR THAT INCLUDES A FIRST LIGHT SOURCE ROW AND A SECOND LIGHT SOURCE ROW HAVING DIFFERENT POSITIONS AND COVERING A MAJORITY OF A READING UNIT, A THIRD LIGHT SOURCE AND A FOURTH LIGHT SOURCE HAVING DIFFERENT POSITIONS IN THE INTERSECTING DIRECTION

CROSS-REFERENCE TO RELATED APPLICATIONS

This application is based on and claims priority under 35 USC 119 from Japanese Patent Application No. 2020-175380 filed Oct. 19, 2020.

BACKGROUND

(i) Technical Field

The present invention relates to a measurement apparatus, an information processing apparatus, and a non-transitory computer readable medium storing a program.

(ii) Related Art

JP2014-240830A discloses processing of setting a scanning distance of a line light source according to characteristics of a measurement target, controlling movement of the line light source and imaging by an imaging section, and estimating reflection characteristics of the measurement target from a plurality of images captured by the imaging section.

JP2017-134561A discloses that an image processing section acquires normal information of a surface of a subject using a plurality of captured images generated by imaging the subject under four or more light source conditions in which positions of the light sources are different from each other.

JP2019-105656A discloses processing of setting a scanning distance of a line light source according to characteristics of a measurement target, controlling movement of the line light source and imaging by an imaging section, and estimating reflection characteristics of the measurement target from a plurality of images captured by the imaging section.

SUMMARY

In grasping an inclination of a part configuring a surface of the measurement target, there may be a case where light needs to be irradiated onto the part from a plurality of directions. In this case, the measurement target may be rotated to irradiate the part with the light from the plurality of directions.

Meanwhile, in a case where the measurement target is rotated, a position of the part to be measured is displaced or a shape of the part is changed. Therefore, information about the inclination of the surface of the part to be measured may not be obtained accurately.

Aspects of non-limiting embodiments of the present disclosure relate to a measurement apparatus, an information processing apparatus, and a non-transitory computer readable medium storing a program that more accurately obtain information about an inclination of a surface of a part to be measured of a measurement target as compared with a case of rotating the measurement target to obtain the information about the inclination of the surface of the part to be measured of the measurement target.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a measurement apparatus including a light irradiator that irradiates a measurement target with light, and a processor that controls the light irradiator, in which the processor is configured to irradiate a specific place of the measurement target with the light from a plurality of places having different positions in one direction, and irradiate the specific place of the measurement target with the light from a plurality of places having different positions in a direction intersecting the one direction.

BRIEF DESCRIPTION OF THE DRAWINGS

Exemplary embodiment(s) of the present invention will be described in detail based on the following figures, wherein:

FIG. 3 is a view describing configurations of a reading unit and the like;

FIG. 4 is a view in a case where the reading unit is viewed from a direction indicated by an arrow IV in FIG. 3;

Figure 1:
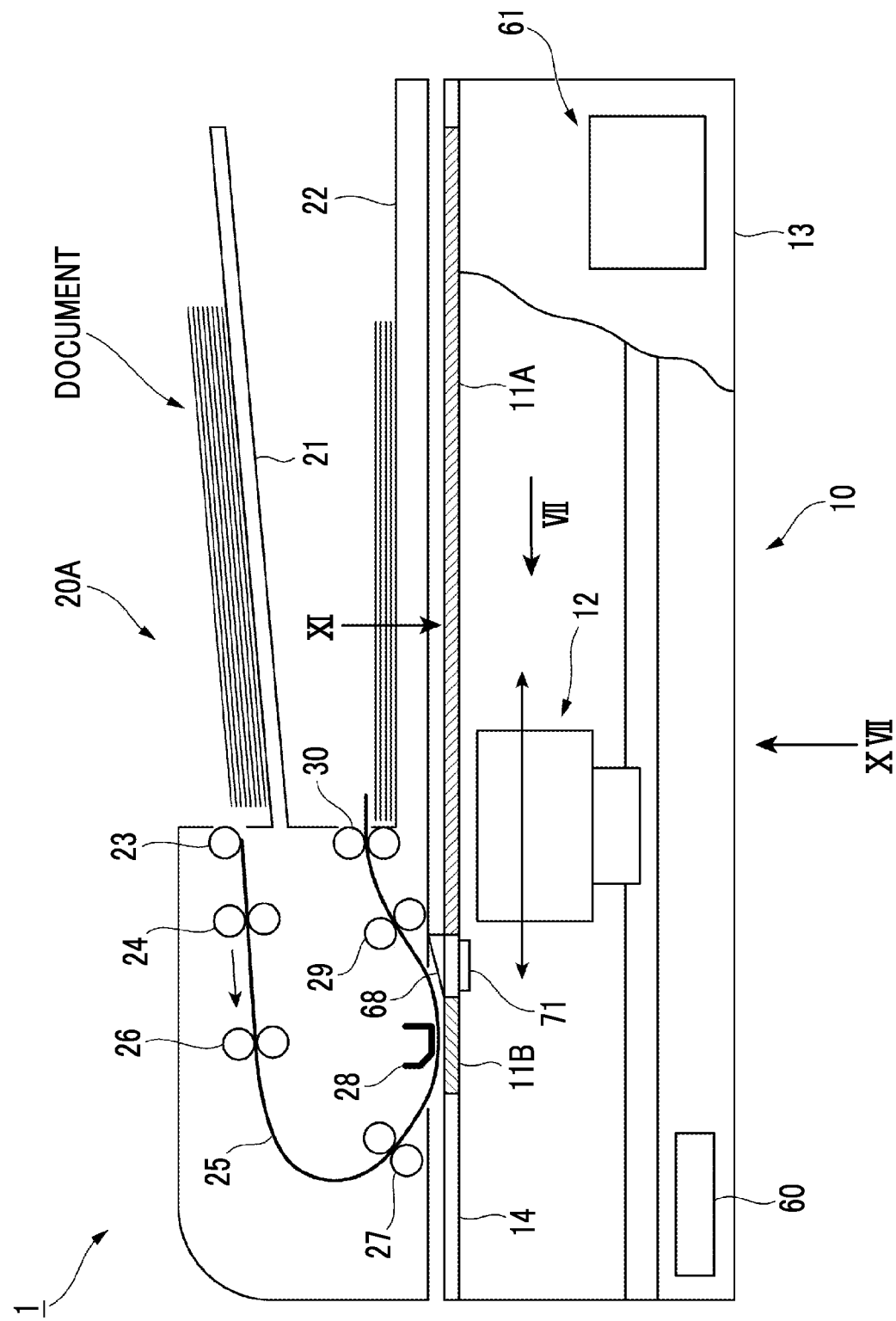
FIG. 1 is a view of an overall configuration of an image reading apparatus.
Figure 7:
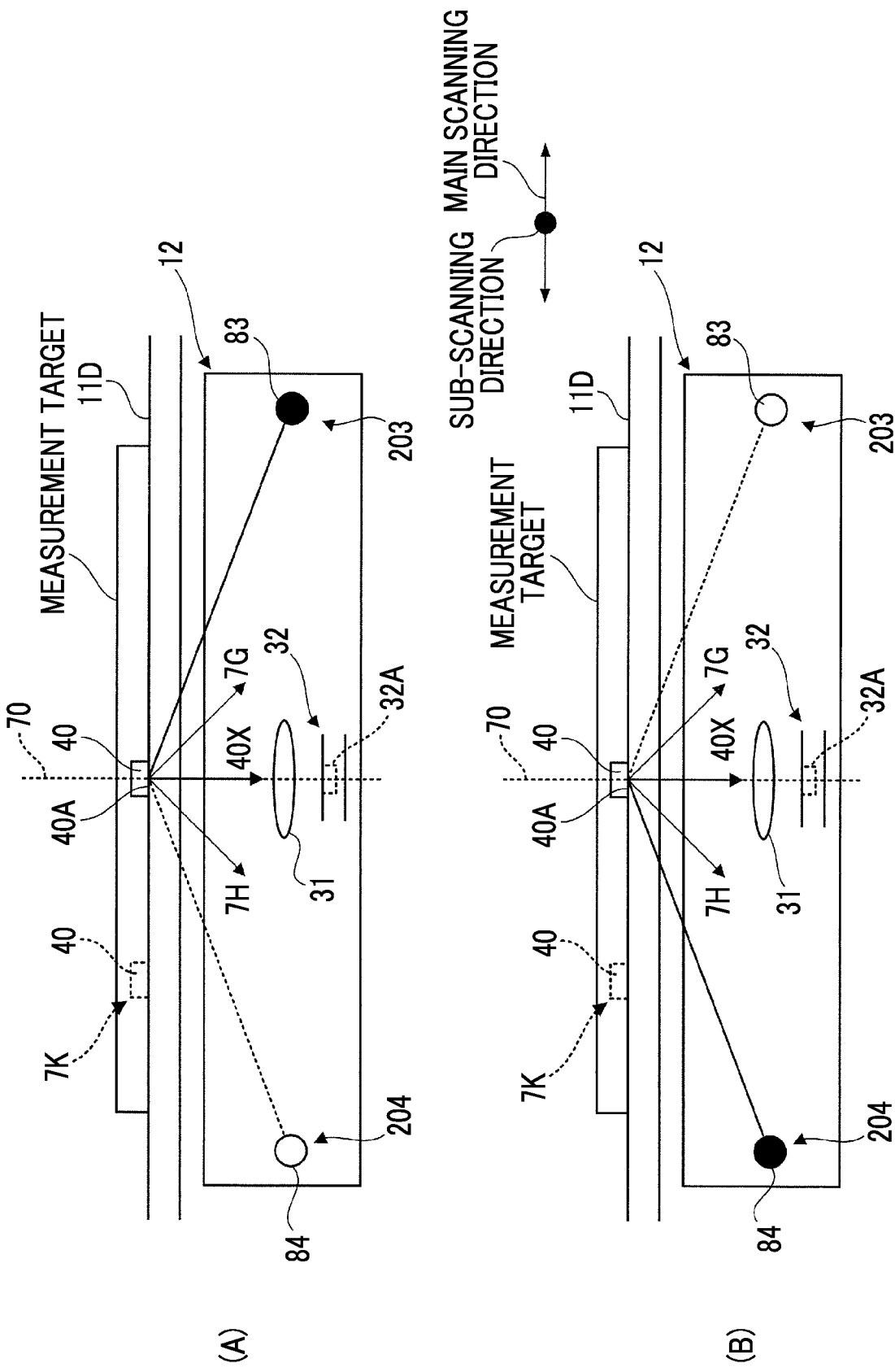
Figure 8:
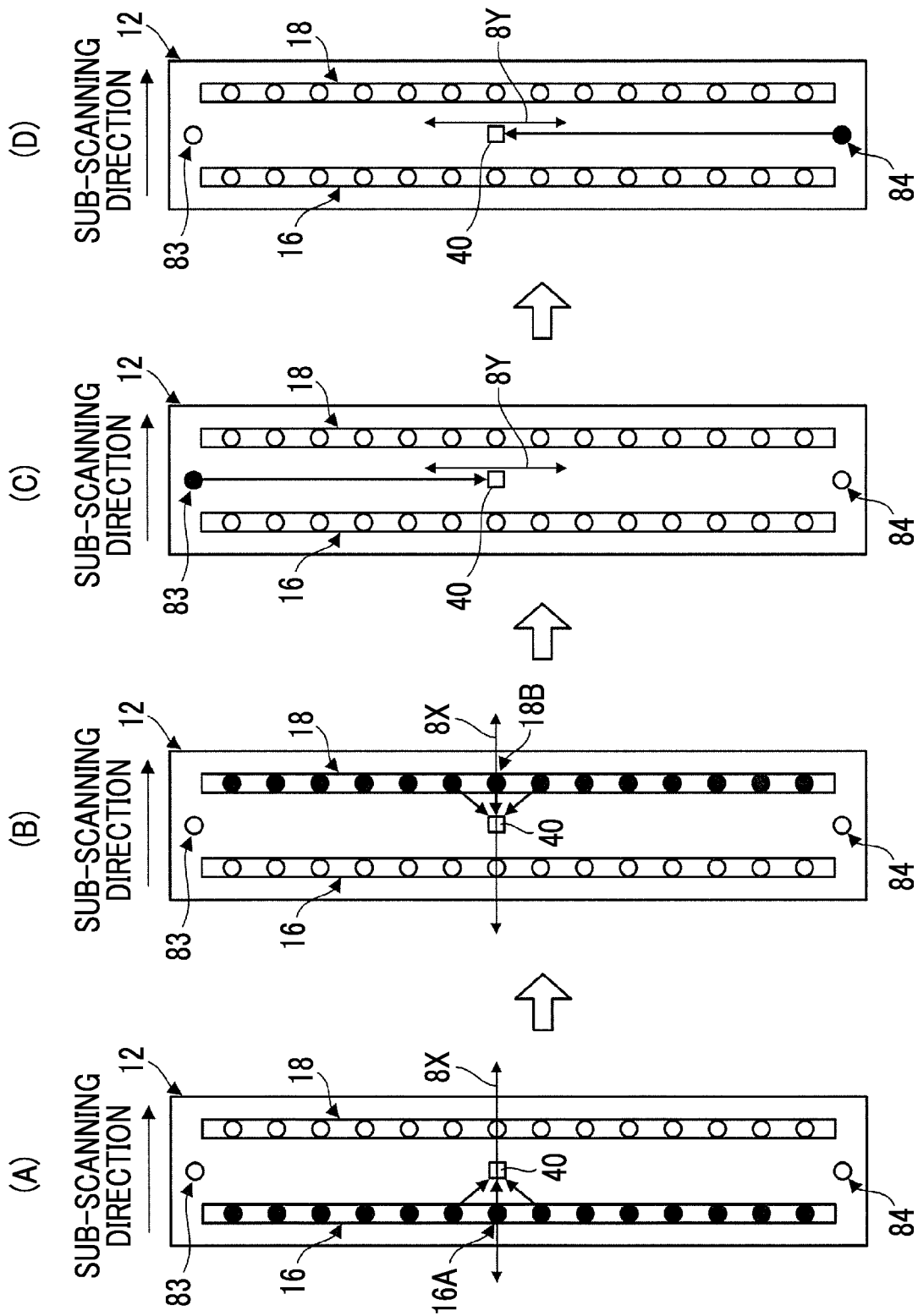
Figure 9:
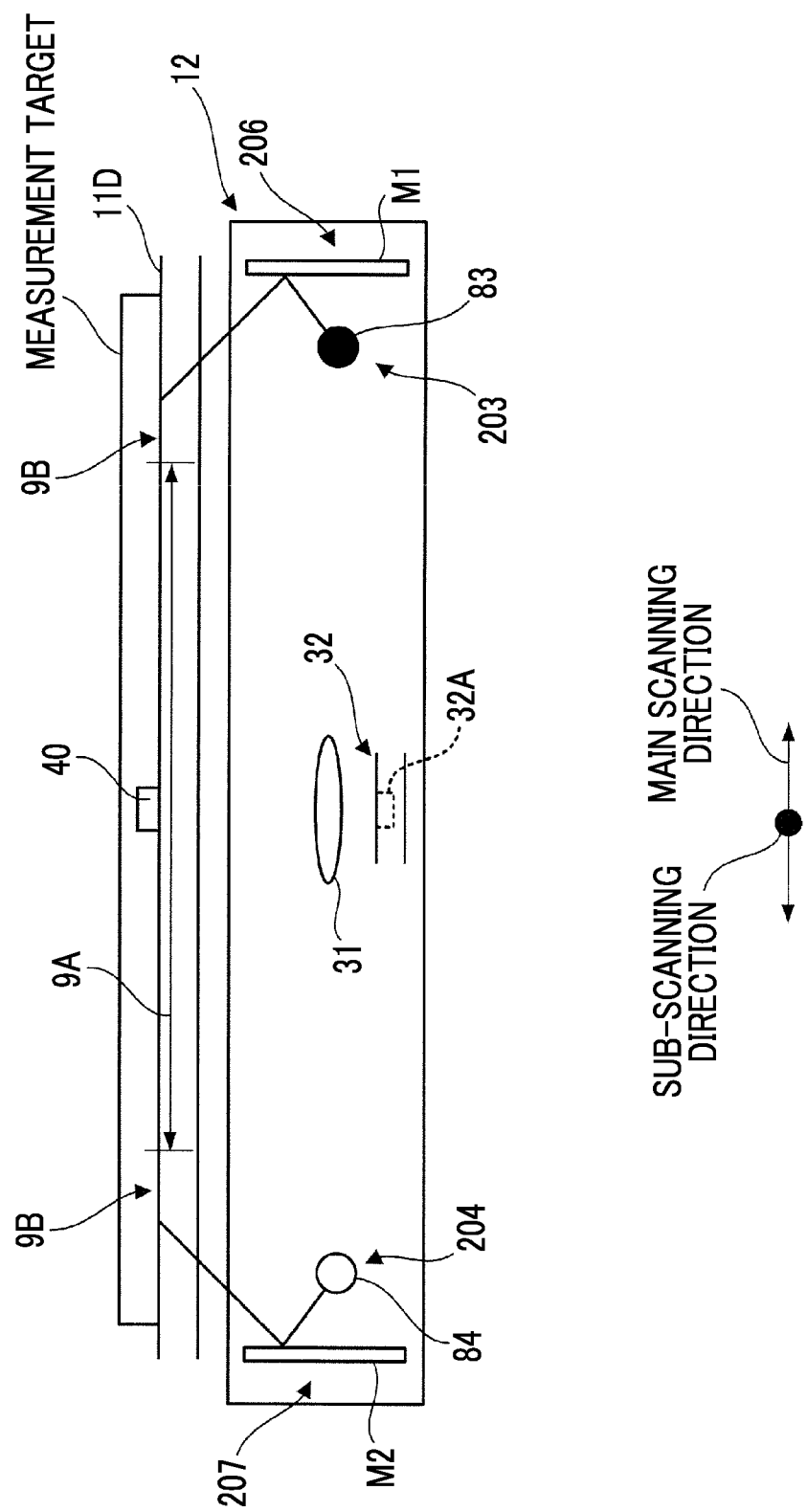
Figure 10:
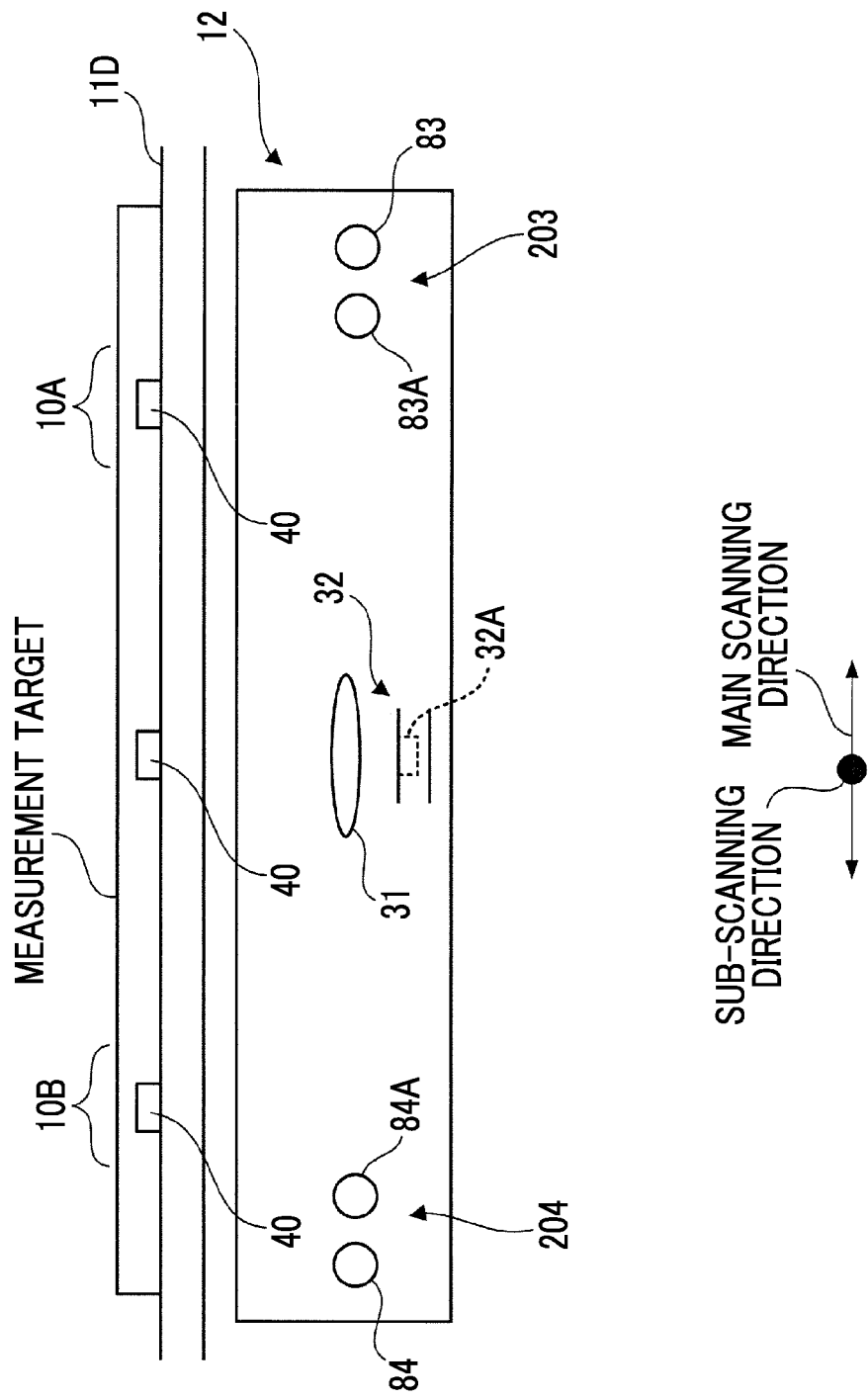
Figure 11:
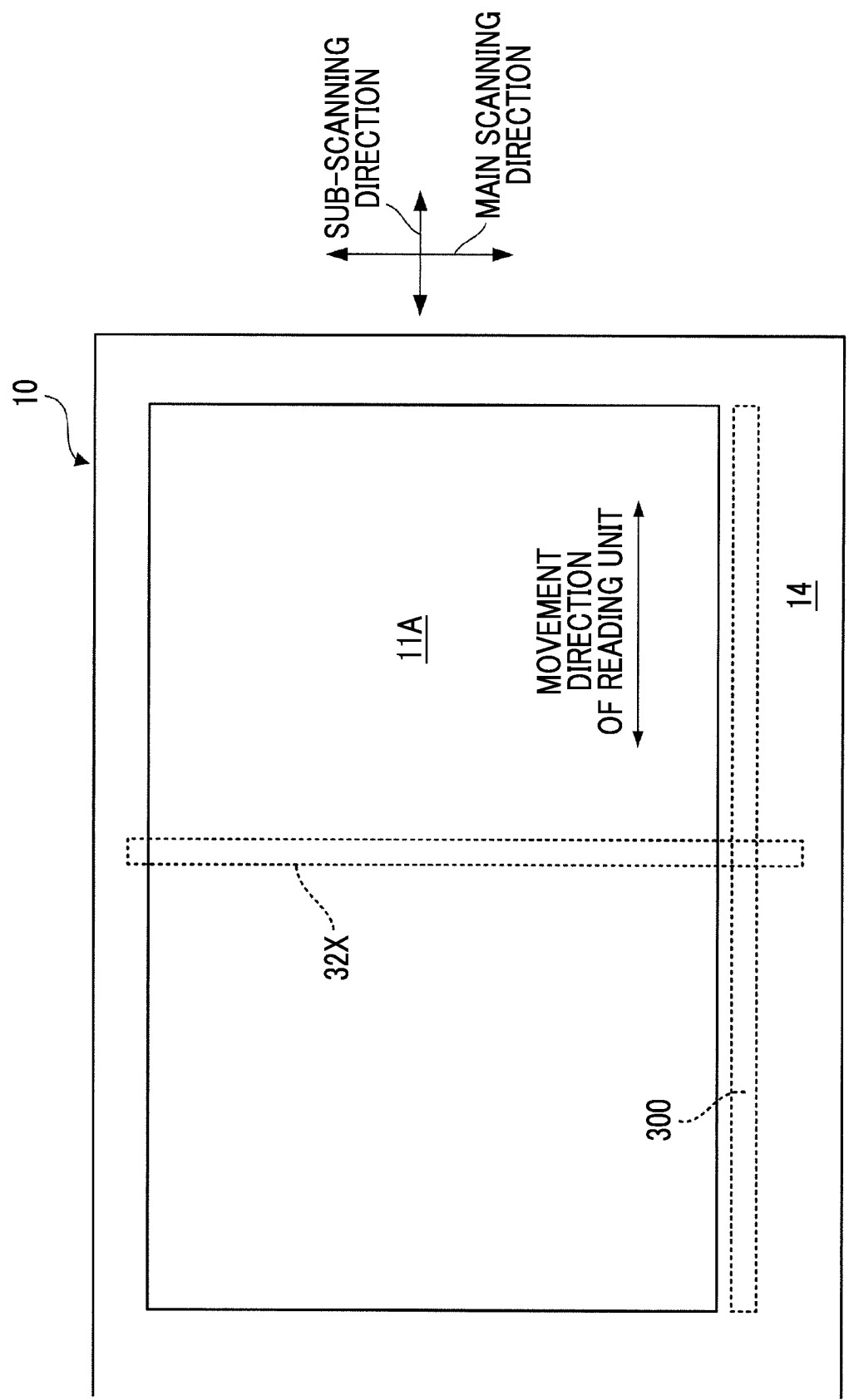
Figure 12:
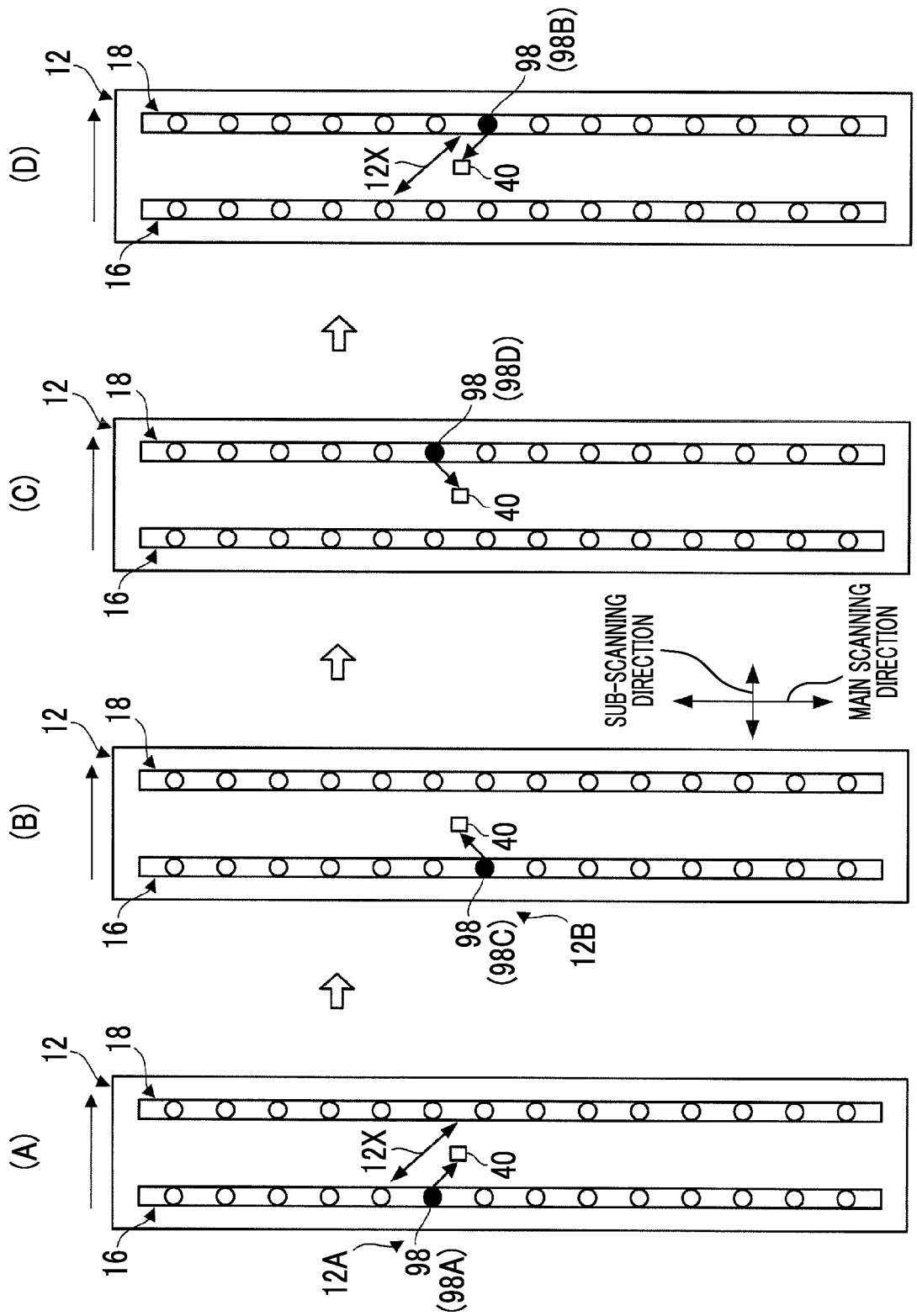
Figure 13:
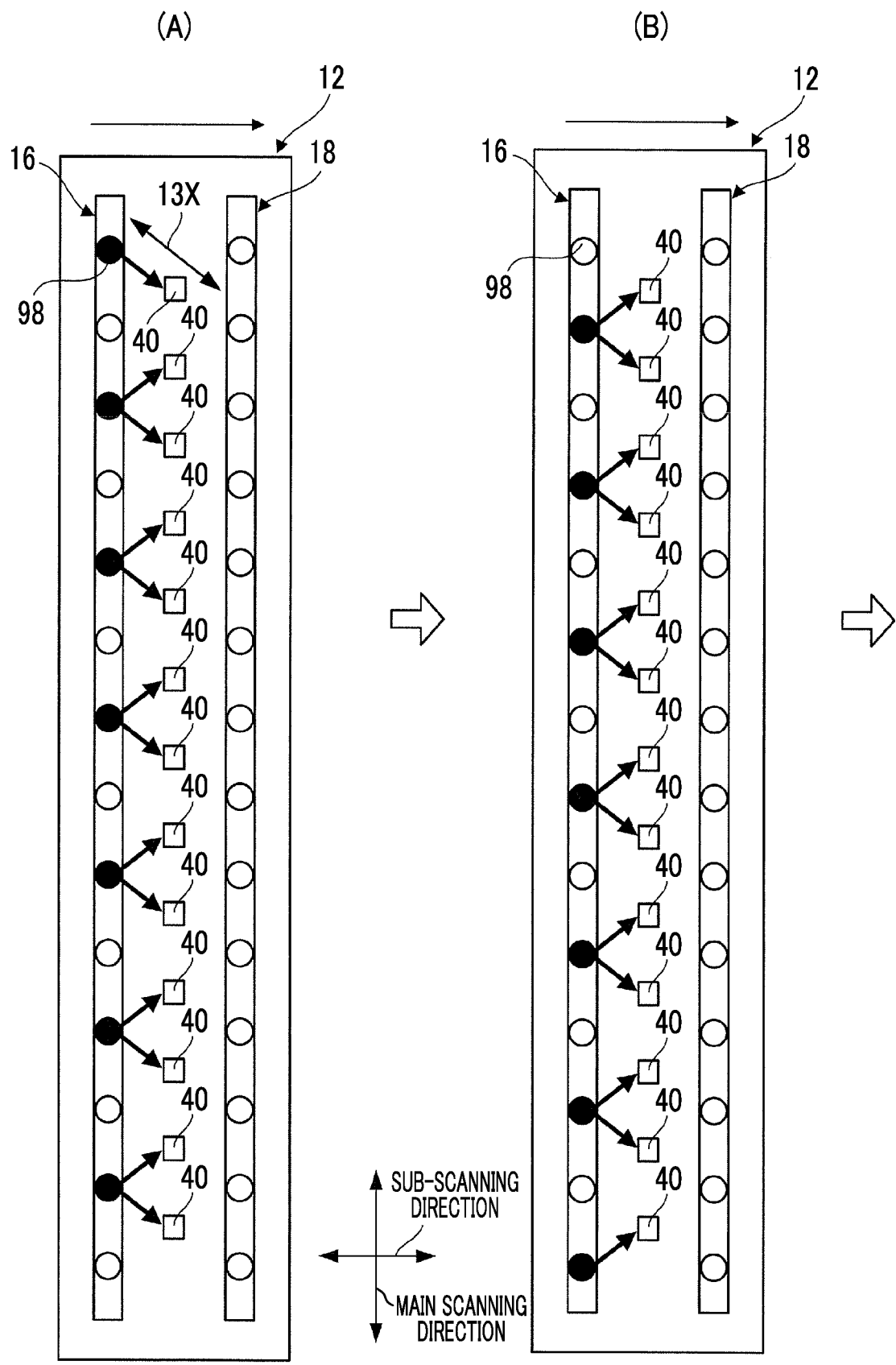
Figure 14:
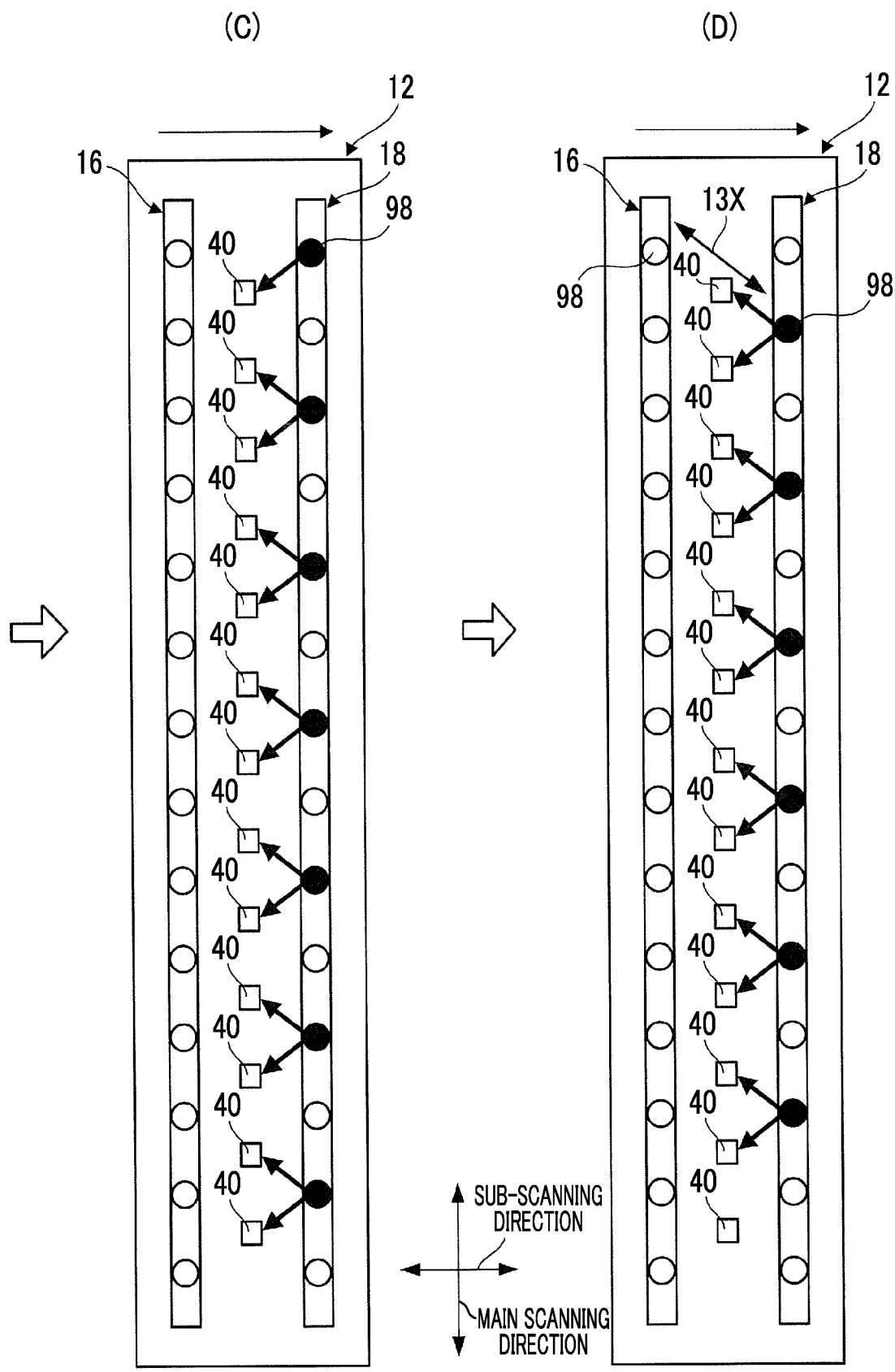
Figure 15:
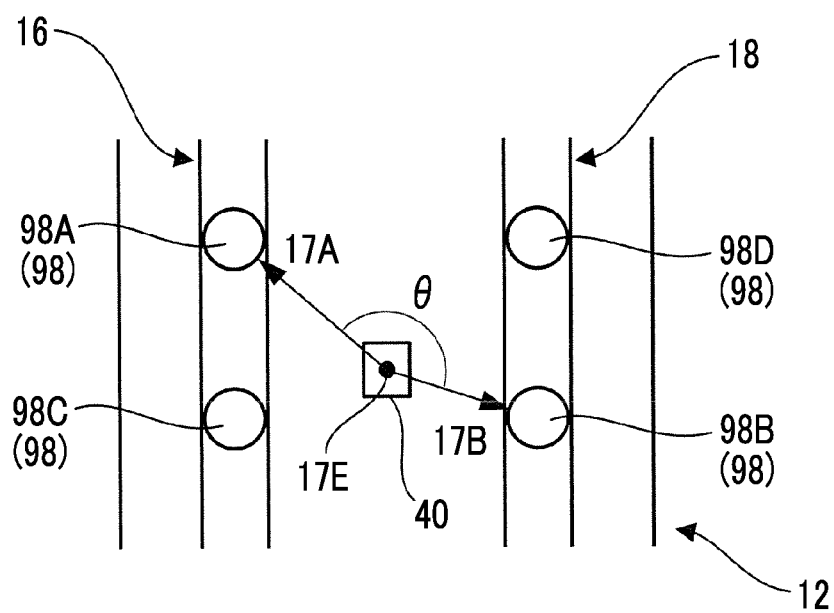
Figure 16:
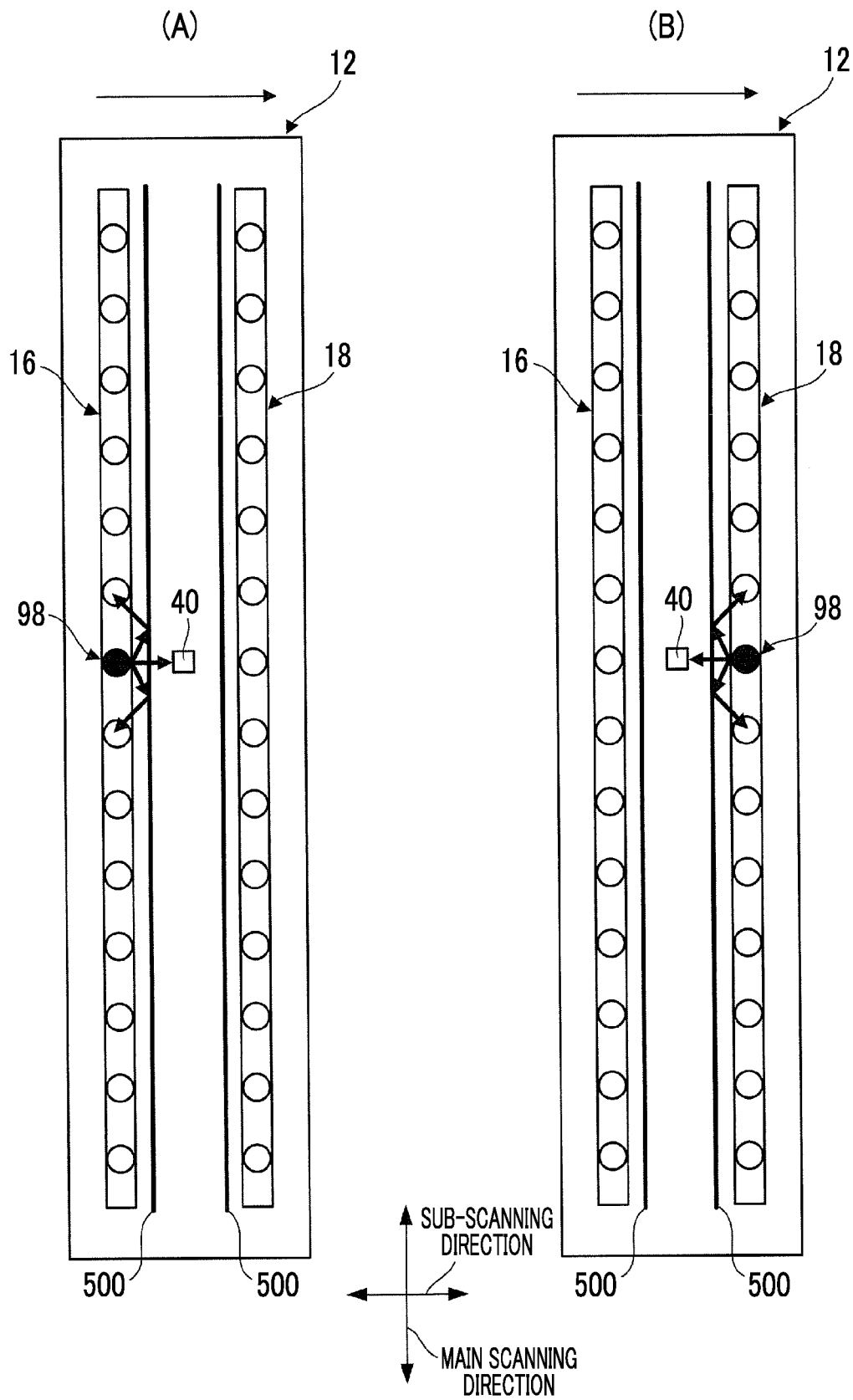
Figure 17:
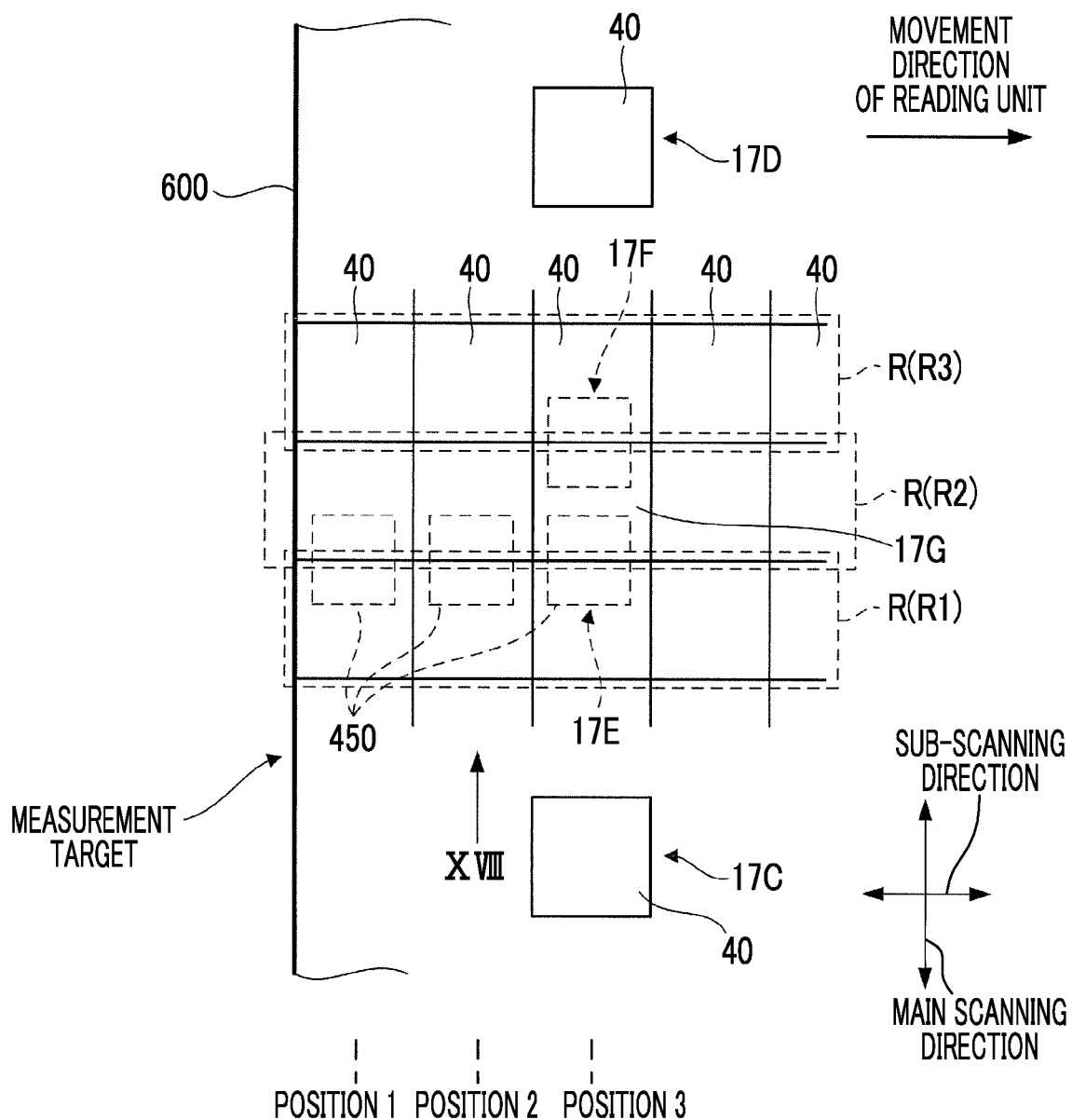
Figure 18:
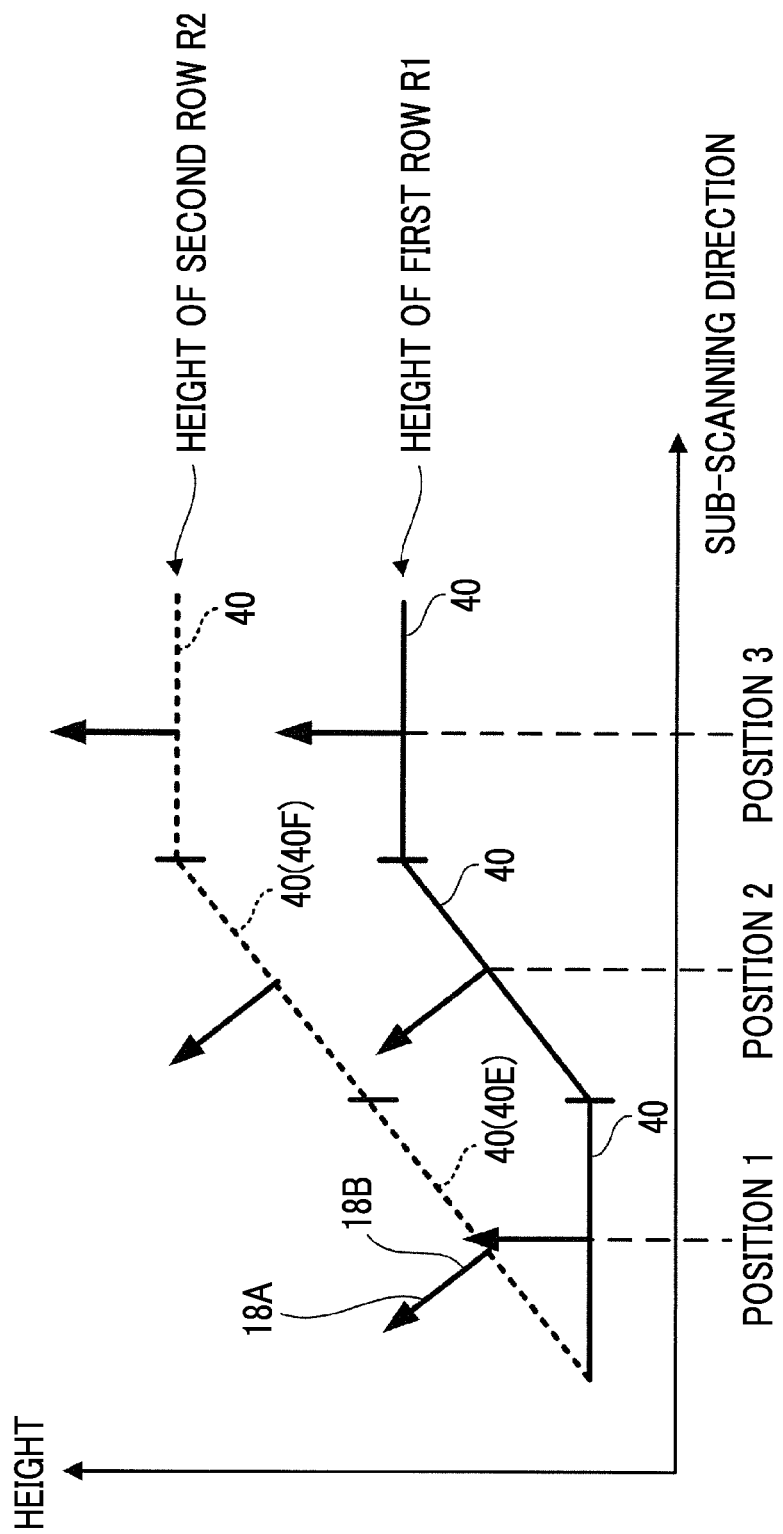
Figure 19:
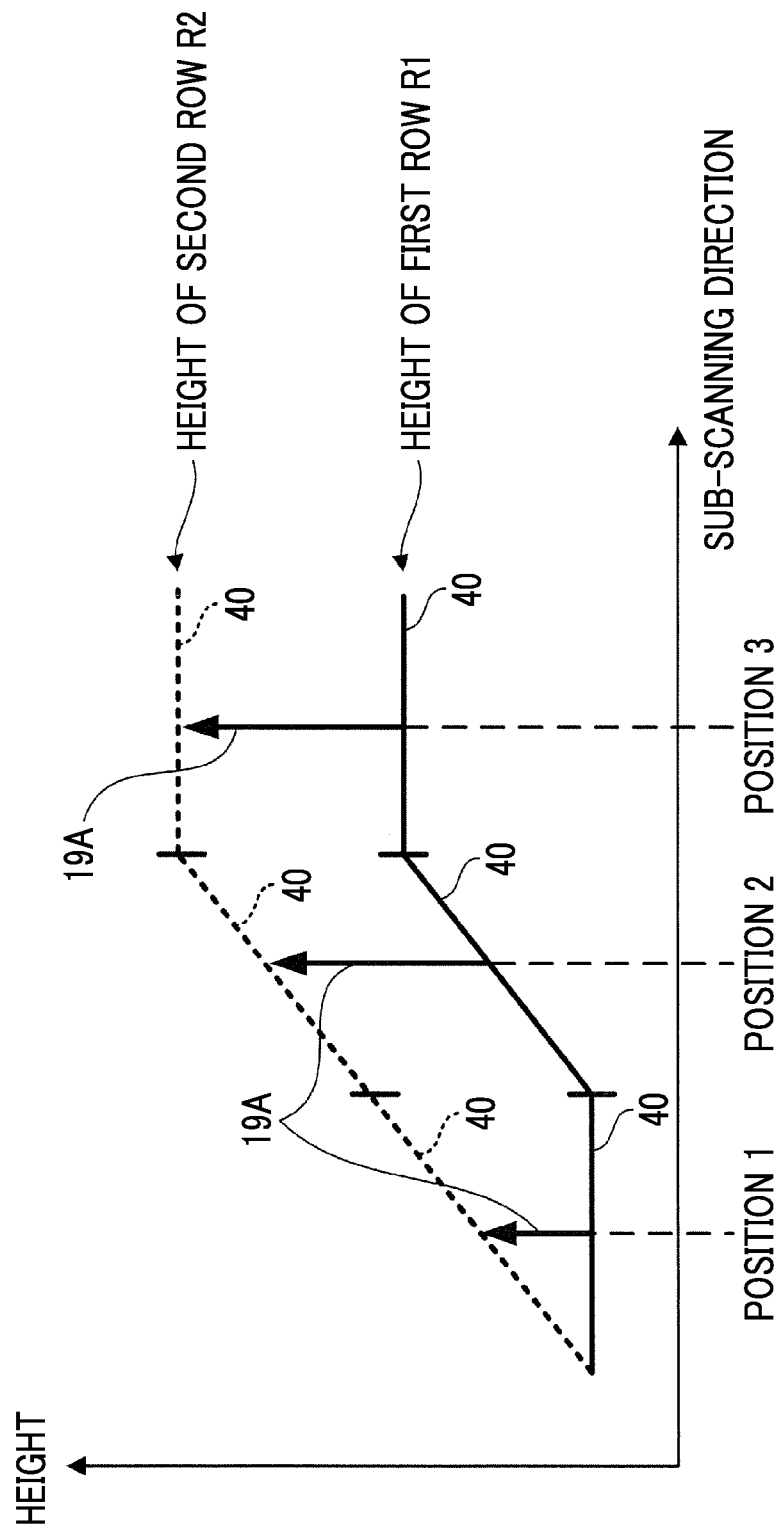
Figure 20:
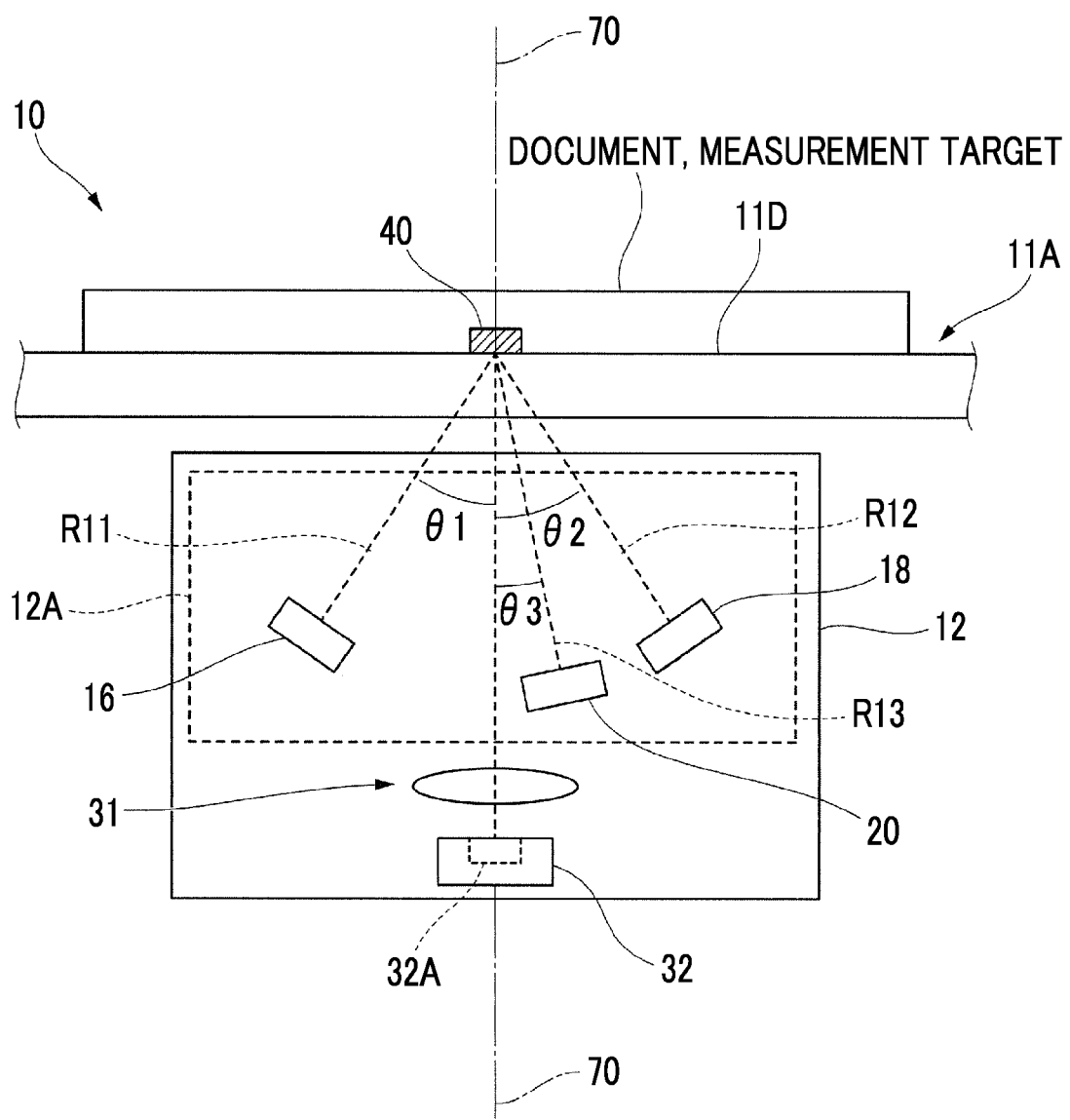

(A) and (B) of FIG. 7 are views in a case where the reading unit and a measurement target are viewed from a direction indicated by an arrow VII in FIG. 1;

(A) to (D) of FIG. 8 are views of a series of flow of turn-on processing of the light sources provided in the reading unit;

FIG. 9 is a view of another configuration example of the reading unit;

FIG. 10 is a view of still another configuration example of the reading unit;

FIG. 11 is a view of another configuration example of a scanner apparatus;

(A) to (D) of FIG. 12 are views of a basic processing flow according to a second exemplary embodiment;

(A) and (B) of FIG. 13 are views of other turn-on states of the light sources;

(C) and (D) of FIG. 14 are views of other turn-on states of the light sources;

FIG. 15 is a view of a state in a case where light sources and a specific place are viewed from above;

(A) and (B) of FIG. 16 are views of turn-on processing of light sources according to a third exemplary embodiment;

FIG. 17 is a view in a case where a measurement target on a support surface is viewed from a direction indicated by an arrow XVII in FIG. 1;

FIG. 18 is a graph showing each height of specific places in a case where a first row and a second row are viewed from a direction indicated by an arrow XVIII in FIG. 17;

FIG. 19 is a graph describing processing executed in a case of acquiring a main scanning direction component; and FIG. 20 is a view of another configuration example of the reading unit.

DETAILED DESCRIPTION

Hereinafter, an exemplary embodiment of the present invention will be described in detail with reference to accompanying drawings.

FIG. 1 is a view of an overall configuration of an image reading apparatus 1.

The image reading apparatus 1 includes a scanner apparatus 10 that scans a document to acquire an image of the document and a document feeding apparatus 20A that conveys the document to the scanner apparatus 10.

The document feeding apparatus 20A is provided with a document stacking portion 21 on which a document bundle consisting of a plurality of documents is stacked. The document feeding apparatus 20A is provided with a paper discharge stacking portion 22 that is provided below the document stacking portion 21 and stacks a read document.

The document feeding apparatus 20A is provided with a feeding roll 23 that feeds the document of the document stacking portion 21 and a handling mechanism 24 that handles the documents one by one.

Further, a conveyance path 25 for conveying the document is provided with a conveyance roll 26 that conveys the documents handled one by one toward a roll on a downstream side and a registration roll 27 that supplies the document while performing registration adjustment to the scanner apparatus 10.

In addition, a chute 28 that assists in conveying the document being read by the scanner apparatus 10 and an out roll 29 that conveys the read document further downstream are provided. Further, a discharge roll 30 that discharges the document to the paper discharge stacking portion 22 is provided.

The scanner apparatus 10 is provided with an accommodation housing 13 and an apparatus frame 14.

A first platen glass 11A on which a stationary document is placed and a second platen glass 11B for transmitting light to read the document conveyed by the document feeding apparatus 20A are attached to the apparatus frame 14.

A guide member 68 that guides the document conveyed by the document feeding apparatus 20A is provided between the first platen glass 11A and the second platen glass 11B.

A white reference plate 71 is provided below the guide member 68. A reading unit 12 that reads the document placed on the first platen glass 11A and the document conveyed by the document feeding apparatus 20A is provided inside the accommodation housing 13.

Further, a movement mechanism (not shown) that moves the reading unit 12 in a left-right direction in the drawing is provided. The movement mechanism is not particularly limited and is configured of a known mechanism.

The reading unit 12 as an example of a movement body moves in the right direction below the first platen glass 11A in a case of reading the document placed on the first platen glass 11A.

In a case of reading the document conveyed by the document feeding apparatus 20A, the reading unit 12 is disposed in a stationary state below the second platen glass 11B.

A light source configured of an LED and the like, an image forming optical system that collects reflected light from the document, and a sensor that receives the light collected by the image forming optical system are provided inside the reading unit 12.

A hinge (not shown) for opening and closing the document feeding apparatus 20A is provided on a rear side of the image reading apparatus 1. In the present exemplary embodiment, the document feeding apparatus 20A can be rotated to the rear side of the image reading apparatus 1.

In a case where the document is placed on the first platen glass 11A, a user rotates the document feeding apparatus 20A toward the rear side of the image reading apparatus 1.

In a case where the user places the document on the first platen glass 11A, the user rotates the document feeding apparatus 20A toward a front side of the image reading apparatus 1 to return the document feeding apparatus 20A to an original position.

Thereafter, in the present exemplary embodiment, a start button (not shown) is pressed to start the reading of the document.

The image reading apparatus 1 according to the present exemplary embodiment is provided with a control section 60 that controls each part of the image reading apparatus 1.

The image reading apparatus 1 is provided with a display apparatus 61 that displays information. The display apparatus 61 is configured of a known apparatus such as a liquid crystal display.

Figure 2:
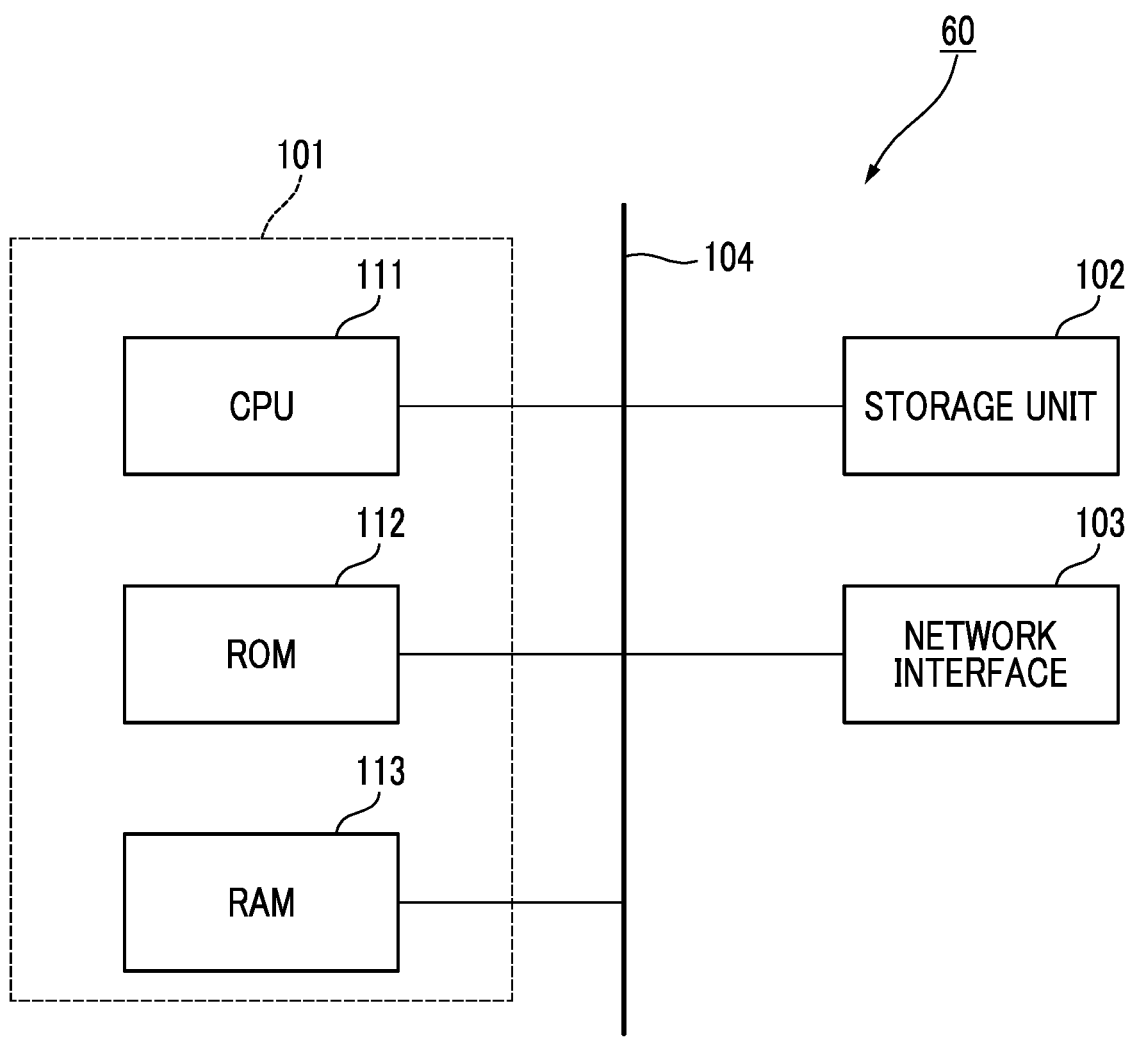
FIG. 2 is a diagram showing a configuration of a control section.

FIG. 2 is a diagram showing a configuration of the control section 60.

The control section 60 includes a control unit 101 that controls the operation of the entire apparatus, a storage section 102 that stores data and the like, and a network interface 103 that realizes communication through a local area network (LAN) cable or the like.

The part of the control unit 101 can be regarded as an information processing apparatus that processes information about a measurement target described below.

The control unit 101 includes a central processing unit (CPU) 111 as an example of a processor, a read only memory (ROM) 112 in which basic software, a basic input output system (BIOS), and the like are stored, and a random access memory (RAM) 113 used as a work area.

The control unit 101 is a so-called computer.

The storage section 102 is configured of a hard disk drive, a semiconductor memory, or the like.

The control unit 101, the storage section 102, and the network interface 103 are connected to each other through a bus 104 and a signal line (not shown).

A program executed by the CPU 111 may be provided to the image reading apparatus 1 in a state of being stored in a computer readable recording medium such as a magnetic recording medium (magnetic tape, magnetic disk, or the like), an optical recording medium (optical disk, or the like), an optical magnetic recording medium, or a semiconductor memory.

The program executed by the CPU 111 may be provided to the image reading apparatus 1 by using a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Configuration of Reading Unit 12 and the like

Figure 3:
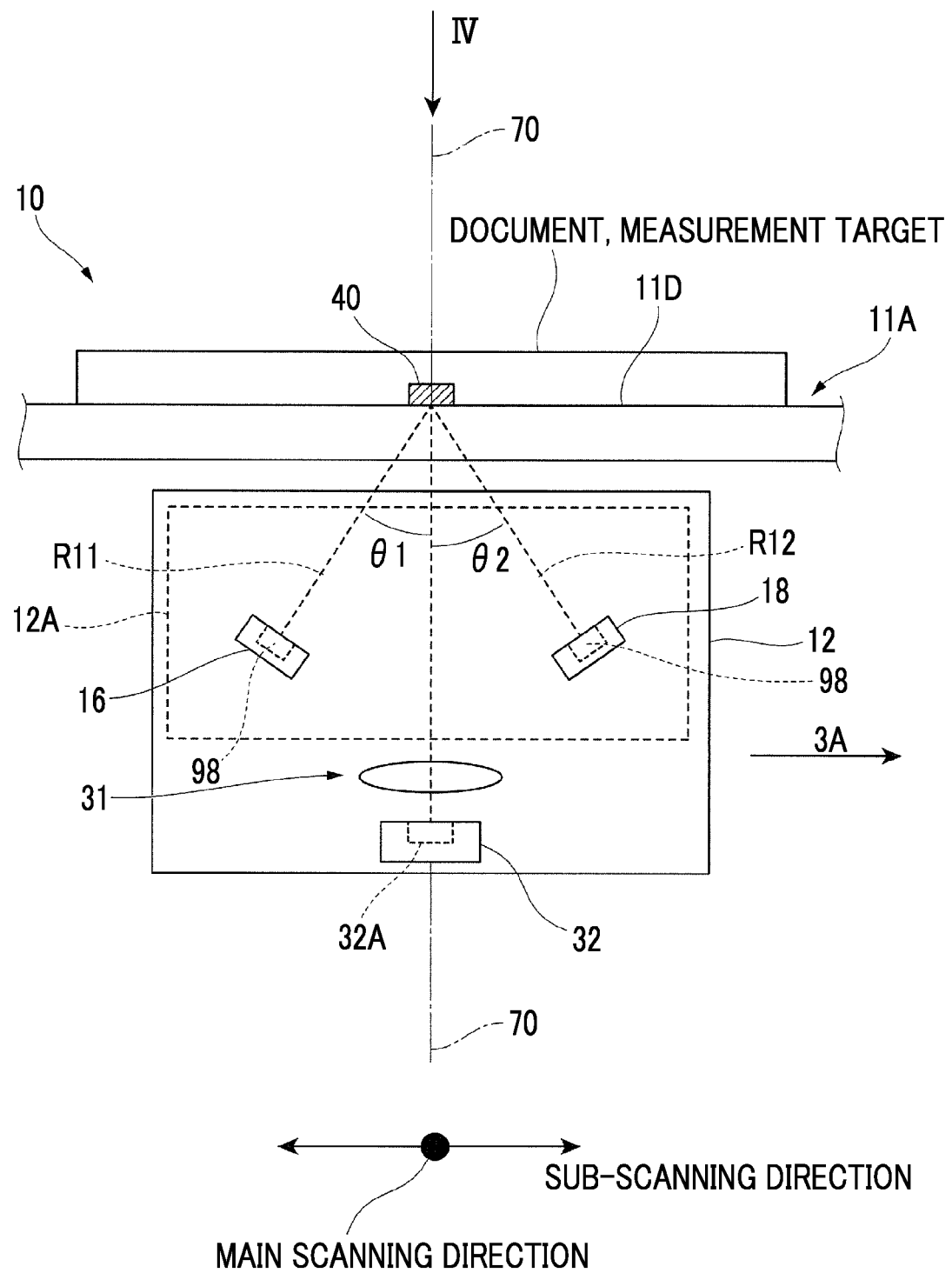

FIG. 3 is a view describing a configuration of the reading unit 12 and the like.

The reading unit 12 as an example of the movement body is provided with a light irradiation section 12A that functions as a part of a light irradiator that irradiates the measurement target with the light.

The light irradiation section 12A is provided with the light source. Specifically, in the present exemplary embodiment, two point light source rows of a first point light source row 16 and a second point light source row 18 are provided as the light source.

The two point light source rows of the first point light source row 16 and the second point light source row 18 are disposed along directions orthogonal to a paper surface in the drawing. In other words, the two point light source rows of the first point light source row 16 and the second point light source row 18 are arranged along a common direction (same direction).

The light irradiation section 12A is provided with a control unit (not shown) that controls turn-on of each of the first point light source row 16 and the second point light source row 18. A position of the control unit is not particularly limited and may be provided on a main body side of the scanner apparatus 10.

In the present exemplary embodiment, a signal from the CPU 111 is input to the control unit, and the light irradiation section 12A irradiates the document with the light.

The reading unit 12 is provided with an image forming optical system 31 that collects the reflected light from the document and a sensor 32 that receives the light collected by the image forming optical system 31.

The reading unit 12 is the movement body and moves in a direction indicated by an arrow 3A in the drawing.

The first platen glass 11A is configured of a transparent glass plate formed in a plate shape. The first platen glass 11A is disposed along a horizontal direction. The first platen glass 11A supports the document from below.

More specifically, the first platen glass 11A has a support surface 11D that faces upward and is flat, and supports the document from below by using the support surface 11D. The first platen glass 11A is not limited to the glass plate and may be an acrylic plate, for example.

In a case where the scanner apparatus 10 reads the document, the document is supported by the support surface 11D and disposed along a plane.

In the image reading apparatus 1, not only general document reading (not only acquisition of color information) but also information about an inclination of a surface of each part of a subject to be read can be obtained.

In other words, the image reading apparatus 1 according to the present exemplary embodiment can be regarded as a measurement apparatus and can measure the inclination of each part configuring the surface of the subject to be read.

In the following, processing in a case where the information about the inclination of the surface is obtained will be described.

In the following, the subject to be read (target) for which the information about the inclination of the surface is obtained is referred to as "measurement target".

The measurement target is not particularly limited, and examples thereof include paper, cloth, metal, resin, and rubber. A shape of the measurement target is not particularly limited. A rolled shape may be set in the case of paper, cloth, and the like.

In the present exemplary embodiment, in a case of the measurement target that can be rolled, the measurement target is disposed in a planar shape along the support surface 11D by being placed on the first platen glass 11A.

Each of the first point light source row 16 and the second point light source row 18 is disposed at different places, and the light irradiation section 12A according to the present exemplary embodiment can irradiate a specific place 40 of the measurement target with the light from a plurality of directions.

In other words, in the present exemplary embodiment, in a case where a place of the measurement target where the inclination of the surface is grasped is regarded as the specific place 40, the specific place 40 can be irradiated with the light from the plurality of directions.

Each of the first point light source row 16 and the second point light source row 18 extends along a direction perpendicular to the paper surface of FIG. 3. Each of the first point light source row 16 and the second point light source row 18 extends along a direction intersecting (orthogonal) with a movement direction of the reading unit 12.

In each of the first point light source row 16 and the second point light source row 18, a plurality of white point light sources 98 configured of light emitting diodes (LED) or the like are arranged in the extension direction of the first point light source row 16 and the second point light source row 18.

The first point light source row 16 and the second point light source row 18 may be configured of a fluorescent lamp, a rare gas fluorescent lamp, or the like.

The reading unit 12 is provided with the image forming optical system 31 and the sensor 32 as described above.

The sensor 32 is a line sensor in which light receiving elements 32A as an example of a light receiving section are arranged in a row. The light receiving element 32A receives the reflected light from the specific place 40 of the measurement target.

The sensor 32 is disposed along the direction perpendicular to the paper surface of FIG. 3. In other words, the sensor 32 extends along the direction intersecting (orthogonal) with the movement direction of the reading unit 12.

In the present exemplary embodiment, the plurality of light receiving elements 32A are arranged in the extension direction of the sensor 32.

In the present exemplary embodiment, the direction in which the first point light source row 16, the second point light source row 18, and the sensor 32 extend is referred to as a main scanning direction. In the present exemplary embodiment, a direction intersecting (orthogonal) with the main scanning direction (movement direction in which the reading unit 12 moves) is referred to as a sub-scanning direction.

The reading unit 12 moves in the sub-scanning direction at a predetermined speed in a case of reading the measurement target. More specifically, the reading unit 12 moves in the direction indicated by the arrow 3A in the drawing.

The image forming optical system 31 is configured of a reflection mirror and an image forming lens, and forms an image of the reflected light from the specific place 40 (part to be read) of the measurement target on the light receiving element 32A of the sensor 32.

Each of the light receiving elements 32A receives the reflected light imaged by the image forming optical system. 31, generates information according to intensity of the received reflected light (information about intensity of the reflected light), and outputs the information.

The sensor 32 is configured of a CCD linear image sensor, a CMOS image sensor, or the like, and outputs information about the intensity of the received light. The sensor 32 is provided with the plurality of light receiving elements 32A. In the sensor 32, the light receiving elements 32A are arranged in the main scanning direction.

The sensor 32 includes a color filter and generates an image signal representing a color of the document or the measurement target. The image reading apparatus 1 according to the present exemplary embodiment generates an RGB value consisting of three values such as RGB (165,42,42) based on this image signal and outputs the RGB value.

In other words, in the present exemplary embodiment, the image reading apparatus 1 acquires color information which is information about the color of the document or the measurement target and further, outputs the color information in a data format (predetermined data format) in which the three values are arranged.

The first point light source row 16 is located on an upstream side of the specific place 40 to be read and irradiates the light toward the specific place 40 located on a downstream side, in the movement direction of the reading unit 12 (movement direction in the case of reading the measurement target).

The second point light source row 18 is located on the downstream side of the specific place 40 and irradiates the light toward the specific place 40 located on the upstream side, in the movement direction of the reading unit 12.

In the present exemplary embodiment, an angle 81 (incident angle of light) formed by a perpendicular line 70 that is a perpendicular line with respect to the support surface 11D and passes through the specific place 40 and an optical path R11 of the light from the first point light source row 16 toward the specific place 40 is 45°.

In the present exemplary embodiment, an angle θ2 (incident angle of light) formed by the perpendicular line 70 and an optical path R12 of the light from the second point light source row 18 toward the specific place 40 is 45°.

As a result, in the present exemplary embodiment, the angle θ1 formed by the optical path R11 of the light from the first point light source row 16 toward the specific place 40 and the perpendicular line 70 is equal to the angle θ2 formed by the optical path R12 of the light from the second point light source row 18 toward the specific place 40 and the perpendicular line 70.

FIG. 4 is a view in a case where the reading unit 12 is viewed from a direction indicated by an arrow IV of FIG. 3. In FIG. 4, the image forming optical system 31 and the sensor 32 are not shown.

The reading unit 12 according to the present exemplary embodiment is provided with a third light source 83 and a fourth light source 84 in addition to the first point light source row 16 and the second point light source row 18.

Each of the third light source 83 and the fourth light source 84 is configured of, for example, the LED. The light source is not limited to the LED, and other types of light sources other than the LED may be used.

The third light source 83 and the fourth light source 84 are disposed such that positions thereof in the main scanning direction are different from each other. The third light source 83 is provided at one end portion 12E of the reading unit 12 in a longitudinal direction, and the fourth light source 84 is provided at the other end portion 12F of the reading unit 12 in the longitudinal direction.

In the sub-scanning direction, the third light source 83 and the fourth light source 84 are located between the first point light source row 16 and the second point light source row 18.

Acquisition Processing of Normal Angle

In the present exemplary embodiment, an angle of a normal line on each surface of the specific places 40 of the measurement target (hereinafter, referred to as "normal angle") is acquired. In other words, in the present exemplary embodiment, the normal angle of each part configuring the surface of the measurement target is acquired.

In acquiring the normal angle, first, a component of this normal angle in the sub-scanning direction (hereinafter, referred to as "sub-scanning direction component") is acquired. A component of this normal angle in the main scanning direction (hereinafter, referred to as "main scanning direction component") is also acquired.

In the present exemplary embodiment, the normal angle is acquired based on the sub-scanning direction component and the main scanning direction component.

In the following, first, acquisition processing of the sub-scanning direction component will be described, and then acquisition processing of the main scanning direction component will be described.

Acquisition Processing of Sub-Scanning Direction Component

In acquiring the sub-scanning direction component, first, the CPU 111 outputs a control signal to the control unit that controls the light irradiation section 12A to irradiate the specific place 40 with the light in order from each of the plurality of directions.

Specifically, the CPU 111 irradiates the specific place 40 with the light in order from a plurality of places having different positions in the sub-scanning direction, which is an example of one direction.

Figure 5A:
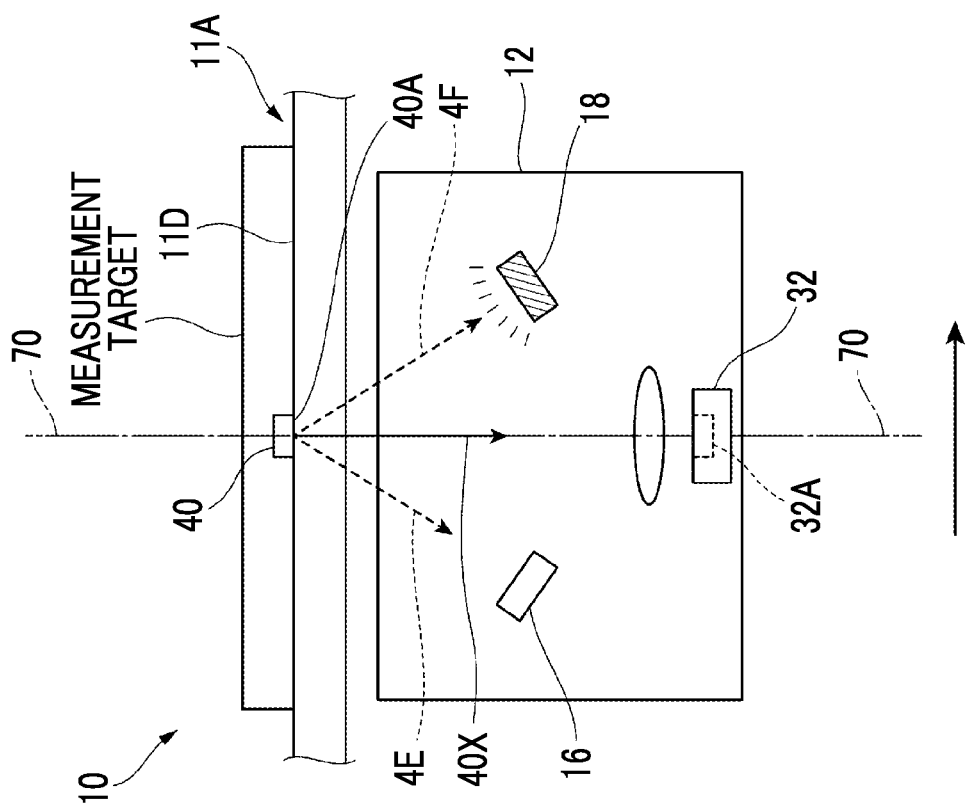
FIGS. 5A and 5B are views of turn-on states of light sources.
Figure 5B:
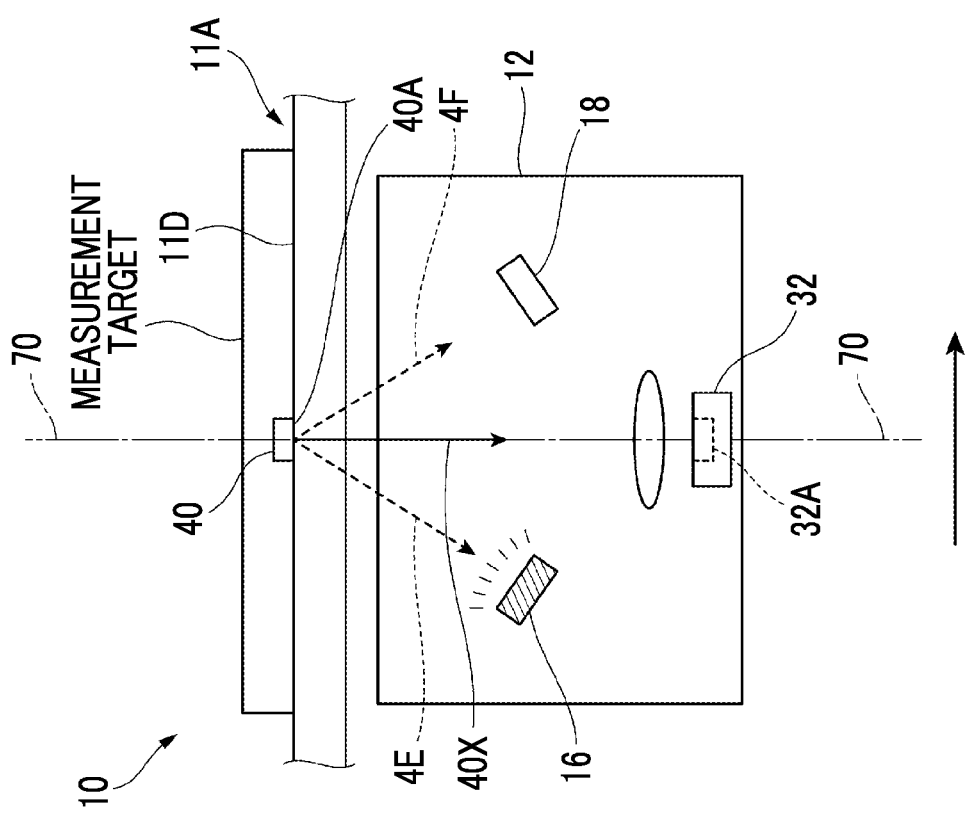

More specifically, the CPU 111 irradiates the specific place 40 with the light in order from each of the first point light source row 16 and the second point light source row 18, as shown in FIGS. 5A and 5B (views of turn-on states of the light sources).

The CPU 111 acquires the information about the inclination of the surface of the specific place 40 (sub-scanning direction component) based on information of the light received by the light receiving element 32A in a case where the specific place 40 is irradiated with the light from the first point light source row 16 and information of the light received by the light receiving element 32A in a case where the specific place 40 is irradiated with the light from the second point light source row 18.

In other words, the CPU 111 obtains the information about the inclination of the surface of the specific place 40 (sub-scanning direction component) based on information output from the light receiving element 32A in a case where the specific place 40 is irradiated with the light from one direction and information output from the light receiving element 32A in a case where the specific place 40 is irradiated with the light from the other direction which is a direction opposite to the one direction.

The irradiation of the light to the specific place 40 will be described in detail.

In the case where the specific place 40 is irradiated with the light from the first point light source row 16, the CPU 111 moves the reading unit 12 in the right direction in the drawing in a state where only the first point light source row 16 is turned on, as shown in FIG. 5A.

In this case, the specific place 40 is irradiated with the light from a lower left direction in the drawing.

In the present exemplary embodiment, the specific place 40 is moved in sequence according to the movement of the reading unit 12.

In the present exemplary embodiment, the "specific place 40" refers to a part of the surface of the measurement target. More specifically, the "specific place 40" refers to a part of the surface of the measurement target, which is read by one light receiving element 32A of the plurality of light receiving elements 32A provided on the sensor 32.

In the present exemplary embodiment, the one light receiving element 32A moves according to the movement of the reading unit 12, and the specific place 40 which is the part read by the one light receiving element 32A also moves in sequence along with the movement of the light receiving element 32A.

Next, in the present exemplary embodiment, the CPU 111 moves the reading unit 12 in the right direction in the drawing in a state where only the second point light source row 18 is turned on, as shown in FIG. 5B. In this case, the specific place 40 is irradiated with the light from a lower right direction in the drawing.

As described above, in a case where each of the first point light source row 16 and the second point light source row 18 is turned on in order, the specific place 40 is irradiated with the light in order from the plurality of places.

Specifically, the specific place 40 is first irradiated with the light from a place located in the lower left direction and then is irradiated with the light from a place located in the lower right direction.

In the present exemplary embodiment, the case has been described in which each of the first point light source row 16 and the second point light source row 18 is turned on in order in the case where the reading unit 12 moves in the right direction in the drawing.

Meanwhile, the present invention is not limited thereto. For example, the first point light source row 16 may be turned on in a case where the reading unit 12 moves in the right direction in the drawing, and the second point light source row 18 may be turned on in a case where the reading unit 12 moves in the left direction in the drawing.

The order in which each light source row is turned on is not particularly limited. The second point light source row 18 may be turned on first, and then the first point light source row 16 may be turned on.

The CPU 111 obtains information on the light received by the light receiving element 32A that reads the specific place 40 in the case where the specific place 40 is irradiated with the light from the first point light source row 16. The CPU 111 obtains information on the light received by the light receiving element 32A in the case where the specific place 40 is irradiated with the light from the second point light source row 18.

In other words, the CPU 111 obtains an output value output from the light receiving element 32A in the case where the specific place 40 is irradiated with the light from the first point light source row 16. The CPU 111 obtains an output value output from the light receiving element 32A in the case where the specific place 40 is irradiated with the light from the second point light source row 18.

The CPU 111 obtains the sub-scanning direction component based on the output value output from the light receiving element 32A in the case where the specific place 40 is irradiated with the light from the first point light source row 16 and the output value output from the light receiving element 32A in the case where the specific place 40 is irradiated with the light from the second point light source row 18.

More specifically, for example, the CPU 111 determines that the sub-scanning direction component is 0° in a case where the output value output from the light receiving element 32A in the case where the specific place 40 is irradiated with the light from the first point light source row 16 is equal to the output value output from the light receiving element 32A in the case where the specific place 40 is irradiated with the light from the second point light source row 18.

More specifically, in a case of assuming the perpendicular line 70 (refer to FIG. 5A) that is a perpendicular line with respect to the support surface 11D and passes through the specific place 40, the CPU 111 outputs information indicating that an inclination of a normal line 40X of a surface 40A of specific place 40, which is with respect to the perpendicular line 70, is 0° in a case where the two output values are equal.

The CPU 111 outputs the inclination of the normal line 40X with respect to the perpendicular line 70 as a value other than 0° in a case where the two output values are different.

In the present exemplary embodiment, for example, in a case where the output value obtained in the case where the specific place 40 is irradiated with the light from the first point light source row 16 is larger than the output value obtained in the case where the specific place 40 is irradiated with the light from the second point light source row 18, the normal line 40X is directed in a direction indicated by an arrow 4E in FIG. 5A.

In the present exemplary embodiment, in this case, the CPU 111 obtains a specific angle (hereinafter, referred to as "normal angle") of the normal line 40X with respect to the perpendicular line 70 based on the two output values and acquires the normal angle as the sub-scanning direction component.

For example, in a case where the output value obtained in the case where the specific place 40 is irradiated with the light from the first point light source row 16 is smaller than the output value obtained in the case where the specific place 40 is irradiated with the light from the second point light source row 18, the normal line 40X is directed in a direction indicated by an arrow 4F in FIG. 5A.

In the present exemplary embodiment, in this case, the CPU 111 obtains a specific angle (normal angle) of the normal line 40X with respect to the perpendicular line 70 based on the two output values and acquires the normal angle as the sub-scanning direction component.

Acquisition Processing of Normal Angle (Sub-Scanning Direction Component)

Details of the acquisition processing of the normal angle (sub-scanning direction component) will be described.

In the present exemplary embodiment, as described above, each of the first point light source row 16 and the second point light source row 18 is individually turned on to acquire two scanned images.

More specifically, first, as described above, the reading unit 12 is moved in the state where the first point light source row 16 is turned on and each of the specific places 40 is irradiated with the light from the lower left direction to obtain a first scanned image.

Next, the reading unit 12 is moved in the state where the second point light source row 18 is turned on and each of the specific places 40 is irradiated with the light from the lower right direction to obtain a second scanned image.

Next, in the present exemplary embodiment, the two scanned images are gray scaled.

Thereafter, two output values are obtained for an identical pixel from the two scanned images.

Specifically, both the output value output from the light receiving element 32A in a case where the light is irradiated from the first point light source row 16 and the output value output from the light receiving element 32A in a case where the light is irradiated from the second point light source row 18 are obtained for an identical specific place 40.

More specifically, in the present exemplary embodiment, one specific place 40 is read by one light receiving element 32A.

In the present exemplary embodiment, the two output values of the output value output from the one light receiving element 32A in the case where the specific place 40 is irradiated with the light from the first point light source row 16 and the output value output from the one light receiving element 32A in the case where the specific place 40 is irradiated with the light from the second point light source row 18 are obtained.

More specifically, in the present exemplary embodiment, two output values are obtained for each of identical pixel positions (x, y) in each scanned image.

In the present exemplary embodiment, the output value obtained from one scanned image is $D\_-45$ (x, y), and the output value obtained from the other scanned image is $D\_45$ (x, y).

The numerical value "−45" indicates the incident angle of the light from the first point light source row 16. The numerical value "45" indicates the incident angle of the light from the second point light source row 18.

Next, in the present exemplary embodiment, the output value ($D\_-45$) obtained in the case where light is irradiated from the first point light source row 16 is associated with an incident angle "−45°", and the output value ($D\_45$) obtained in the case where the light is irradiated from the second point light source row 18 is associated with an incident angle "+45°".

In the present exemplary embodiment, in a case where the incident angle is ±180° with respect to the perpendicular line 70, an output value from the sensor 32 becomes zero. Therefore, the output value "0" is associated with an incident angle "−180°", and the output value "0" is associated with an incident angle "+180°".

Next, the CPU 111 sets the incident angle as an independent variable (for example, −180° to +180°) and sets the output value as a dependent variable (for example, 0 to 255), and then performs fitting.

More specifically, the CPU 111 performs the fitting using a BRDF model (Cook-Torrance or the like) or spline interpolation based on four incident angles of −180°, −45°, +45°, and +180° and four output values associated with each of the four incident angles.

More specifically, the CPU 111 performs, for example, processing of fitting a spline curve to the four output values.

Next, a peak is extracted from the spline curve after the fitting, and the independent variable (incident angle) corresponding to this peak is grasped as the incident angle of the surface 40A of the target specific place 40.

The CPU 111 obtains the normal angle (sub-scanning direction component) of the surface 40A of the specific place 40 based on the grasped incident angle.

The CPU 111 performs the processing for each of all the specific places 40 to obtain the normal angle (sub-scanning direction component) for each specific place 40.

Figure 6:
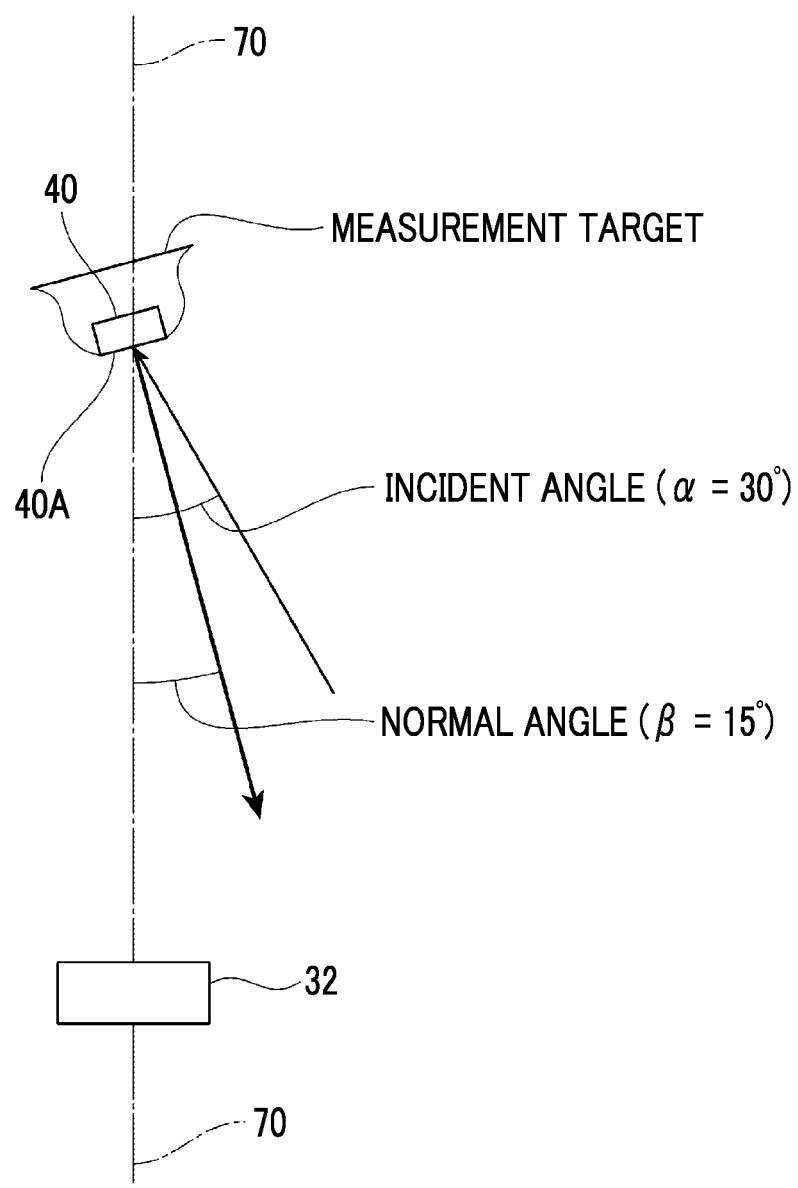
FIG. 6 is a view of a relationship between an incident angle and a normal angle.

FIG. 6 is a view of a relationship between the incident angle and the normal angle.

In FIG. 6, an angle indicated by a reference numeral α indicates an example of the incident angle obtained based on the peak of the spline curve after the fitting. Specifically, in this example, a case is illustrated in which an incident angle of 30° is obtained as the incident angle.

In a case where the CPU 111 grasps the incident angle of 30°, 15° which is a half value of the incident angle is obtained as a normal angle β of the surface 40A of the specific place 40. In this example, the CPU 111 acquires this normal angle β(15°) as the sub-scanning direction component.

In acquiring the information about the inclination of the surface 40A of the specific place 40, for example, the specific place 40 may be irradiated with the light from only one place.

In this case, the inclination of the surface 40A of the specific place 40 can be grasped tentatively by receiving the reflected light from the specific place 40 and by grasping the intensity of the received reflected light.

Meanwhile, the intensity of the reflected light is influenced by a color of the specific place 40, and the intensity of the reflected light changes according to the color of the specific place 40. Therefore, the inclination of the surface 40A of the specific place 40 may not be accurately grasped.

On the contrary, in a case where the specific place 40 is irradiated with the light in order from each of the two places as in the present exemplary embodiment, the influence of the color is reduced and the inclination of the surface 40A of the specific place 40 is obtained more accurately.

Acquisition Processing of Main Scanning Direction Component

Next, the acquisition processing of the main scanning direction component (component of the normal angle in the main scanning direction) will be described.

In the acquisition processing of the main scanning direction component, the CPU 111 first outputs the control signal to the control unit that controls the light irradiation section 12A to irradiate the specific place 40 with the light in order from each of the plurality of directions, also in this case.

(A) and (B) of FIG. 7 are views in a case where the reading unit 12 and the measurement target are viewed from a direction indicated by an arrow VII in FIG. 1.

In the acquisition processing of the main scanning direction component, the CPU 111 turns on the third light source 83 and the fourth light source 84 in order to acquire the main scanning direction component as shown in (A) and (B) of FIG. 7.

Specifically, the CPU 111 obtains information of the light received by the light receiving element 32A in a case where the specific place 40 is irradiated with the light from the third light source 83 and information of the light received by the light receiving element 32A in a case where the specific place 40 is irradiated with the light from the fourth light source 84, and acquires the main scanning direction component based on the pieces of information.

In other words, the CPU 111 acquires the main scanning direction component based on an output value output from the light receiving element 32A in a case where the specific place 40 is irradiated with the light from one place and an output value output from the light receiving element 32A in a case where the specific place 40 is irradiated with the light from the other place, also in this case.

More specifically, the CPU 111 moves the reading unit 12 in the sub-scanning direction in a state where only the third light source 83 is turned on (refer to (A) of FIG. 7). In this case, the specific place 40 shown in (A) of FIG. 7 is irradiated with the light from the lower right direction in the drawing.

Next, the CPU 111 moves the reading unit 12 in the sub-scanning direction in a state where only the fourth light source 84 is turned on, as shown in (B) of FIG. 7. In this case, the specific place 40 is irradiated with the light from the lower left direction in the drawing.

As described above, the specific place 40 is irradiated with the light from the plurality of places also in a case where the main scanning direction component is acquired.

In (A) and (B) of FIG. 7, only one specific place 40 is displayed.

In the present exemplary embodiment, similarly, the light irradiation from the lower right direction and the light irradiation from the lower left direction is performed in order for each of a plurality of other specific places 40 (not shown) located on a right side of the one specific place 40 in the drawing and a plurality of other specific places 40 (not shown) located on a left side of the one specific place 40 in the drawing.

The turn-on of the third light source 83 and the fourth light source 84 may be performed in the case where the reading unit 12 moves to the right direction in FIG. 1, similarly to the above. The invention is not limited thereto. For example, one light source of the third light source 83 and the fourth light source 84 may be turned on in the case where the reading unit 12 moves to the right direction, and the other light source may be turned on in the case where the reading unit 12 moves to the left direction.

The order in which the light sources are turned on is not particularly limited. The fourth light source 84 may be turned on first, and then the third light source 83 may be turned on.

The CPU 111 obtains the output value output from the light receiving element 32A in the case where the specific place 40 is irradiated with the light from the third light source 83. The CPU 111 obtains the output value output from the light receiving element 32A in the case where the specific place 40 is irradiated with the light from the fourth light source 84.

The CPU 111 obtains the information about the inclination of the surface 40A of the specific place 40 (main scanning direction component) based on the output value output from the light receiving element 32A in the case where the specific place 40 is irradiated with the light from the third light source 83 and the output value received by the light receiving element 32A in the case where the specific place 40 is irradiated with the light from the fourth light source 84, similarly to the processing in the case of obtaining the sub-scanning direction component.

More specifically, for example, the CPU 111 outputs information indicating that an inclination of the normal line 40X of the surface 40A of the specific place 40, which is with respect to the perpendicular line 70, is 0° in a case where the output value output from the light receiving element 32A in the case where the specific place 40 is irradiated with the light from the third light source 83 is equal to the output value output from the light receiving element 32A in the case where the specific place 40 is irradiated with the light from the fourth light source 84, similarly to the above.

The CPU 111 outputs the inclination of the normal line 40X with respect to the perpendicular line 70 as a value other than 0° in the case where the two output values are different.

For example, in a case where the output value output from the light receiving element 32A in the case where the specific place 40 is irradiated with the light from the third light source 83 is larger than the output value output from the light receiving element 32A in the case where the specific place 40 is irradiated with the light from the fourth light source 84, the normal line 40X is directed in a direction indicated by an arrow 7G in (A) of FIG. 7.

The CPU 111 obtains a specific angle (hereinafter, referred to as "normal angle") of the normal line 40X with respect to the perpendicular line 70 based on the two output values.

For example, in a case where the output value output from the light receiving element 32A in the case where the specific place 40 is irradiated with the light from the third light source 83 is smaller than the output value output from the light receiving element 32A in the case where the specific place 40 is irradiated with the light from the fourth light source 84, the normal line 40X is directed in a direction indicated by an arrow 7H in (A) of FIG. 7.

The CPU 111 obtains a specific angle (normal angle) of the normal line 40X with respect to the perpendicular line 70 based on the two output values, also in this case.

Details of Processing

Details of the processing of acquiring the normal angle (main scanning direction component) will be described.

In the present exemplary embodiment, each of the third light source 83 and the fourth light source 84 is individually turned on to acquire two scanned images.

More specifically, the reading unit 12 is moved in the state where the third light source 83 is turned on and each of the specific places 40 is irradiated with the light from the lower right direction to obtain a first scanned image.

Next, the reading unit 12 is moved in the state where the fourth light source 84 is turned on and each of the specific places 40 is irradiated with the light from the lower left direction to obtain a second scanned image.

Next, in the present exemplary embodiment, the two scanned images are gray scaled.

Thereafter, two output values for an identical pixel are obtained from the two scanned images. In other words, two output values are obtained for an identical specific place 40.

More specifically, both the output value output from the light receiving element 32A in a case where the light is irradiated from the third light source 83 and the output value output from the light receiving element 32A in a case where the light is irradiated from the fourth light source 84 are obtained for the identical specific place 40.

In other words, in each scanned image, two output values are obtained for each of identical pixel positions (x, y).

In the present exemplary embodiment, the output value obtained from one scanned image is $D\_75\ (x, y)$, and the output value obtained from the other scanned image is $D\_{-75}\ (x, y)$.

The numerical value "75" indicates an incident angle of the light from the third light source 83 (refer to (A) of FIG. 7) toward the specific place 40 (specific place 40 located in the center) shown in (A) of FIG. 7. The numerical value "−75" indicates an incident angle of the light from the fourth light source 84 toward the specific place 40.

The specific place 40 (specific place 40 located in the center) shown in (A) of FIG. 7 is located at an intermediate position between the third light source 83 and the fourth light source 84.

Next, in the present exemplary embodiment, the output value (D_75) obtained in the case where the light is irradiated from the third light source 83 is associated with the incident angle "+75°", and the output value (D_−75) obtained in the case where the light is irradiated from the fourth light source 84 is associated with an incident angle "−75°".

In the present exemplary embodiment, in a case where the incident angle is ±180° with respect to the perpendicular line 70, an output value from the light receiving element 32A becomes zero. Therefore, the output value "0" is associated with an incident angle "−180°", and the output value "0" is associated with an incident angle "+180°".

Next, the CPU 111 sets the incident angle as an independent variable (for example, −180° to +180° and sets the output value as a dependent variable (for example, 0 to 255), and then performs fitting, similarly to the above.

More specifically, the CPU 111 performs the fitting using the BRDF model (Cook-Torrance or the like) or the spline interpolation based on four incident angles of −180°, −75°, +75°, and +180° and four output values associated with each of the four incident angles.

More specifically, the CPU 111 performs, for example, processing of fitting a spline curve to the four output values.

Next, a peak is extracted from the spline curve after the fitting, and the independent variable (incident angle) corresponding to this peak is grasped as the incident angle of the surface 40A of the target specific place 40.

The CPU 111 obtains the normal angle (main scanning direction component) of the surface 40A of the specific place 40 based on the grasped incident angle. Specifically, the CPU 111 acquires a value of half of the incident angle as the normal angle (main scanning direction component), similarly to the above.

The CPU 111 performs this processing for each of all the specific places 40 to obtain the normal angle (main scanning direction component) for each of the specific places 40.

(A) and (B) of FIG. 7 show the specific places 40 at the intermediate position between the third light source 83 and the fourth light source 84.

For another specific place 40 located outside the intermediate position, the normal angle (main scanning direction component) is, for example, preferably acquired by correcting the two output values obtained for the specific place 40 and using the two corrected output values.

Specifically, in a case where the normal angle (main scanning direction component) of the specific place 40 at a position indicated by a reference numeral 7K in (A) of FIG. 7 is grasped, one or both of the two output values obtained for the specific place 40 are corrected, and then the normal angle is, for example, preferably grasped based on the two corrected output values.

For the specific place 40 located outside the intermediate position, an angle formed by an optical path of the light from an installation place of the third light source 83, which is an example of a third place, toward the specific place 40 and the support surface 11D is different from an angle formed by an optical path of the light from an installation place of the fourth light source 84, which is an example of a fourth place, toward the specific place 40 and the support surface 11D.

In this case, even in a case where the surface 40A of the specific place 40 is horizontal and the normal angle is originally output as 0°, the normal angle may be output as a value other than 0° due to the difference in the formed angle.

Therefore, as described above, the two output values output from the light receiving element 32A are corrected, and then the normal angle is, for example, preferably grasped based on the two corrected output values.

More specifically, in the correction, the CPU 111 performs the correction to increase the output value output from the light receiving element 32A in a case where the specific place 40 is irradiated with the light from an installation place of the two installation places with a small formed angle and decrease the output value output from the light receiving element 32A in a case where the specific place 40 is irradiated with the light from an installation place thereof with a large formed angle.

The CPU 111 grasps the normal angle based on the two corrected output values by the method described above (the method using spline interpolation or the like).

In the present exemplary embodiment, a positional relationship between the third light source 83, the fourth light source 84, and the specific place 40 changes according to a position of the specific place 40 in the main scanning direction.

In this case, even for the specific place 40 having the normal angle of originally 0°, the normal angle thereof may be other than 0° in a case where the specific place 40 is closer to any one of the third light source 83 or the fourth light source 84.

Therefore, in the present exemplary embodiment, one or both of the two output values are corrected such that the influence of the formed angle is small, and the normal angle is grasped based on the two corrected output values as described above.

Correction of Output Value

The correction of the output value will be described in more detail.

In the present exemplary embodiment, the reading unit 12 is moved to a position facing the white reference plate 71 (refer to FIG. 1) before the two output values are corrected.

Next, the third light source 83 is turned on and each of a plurality of pixels configuring the reference plate 71 is irradiated with the light from the lower right direction to obtain a first scanned image (scanned image for one line).

Next, the fourth light source 84 is turned on and each of the plurality of pixels configuring the reference plate 71 is irradiated with the light from the lower left direction to obtain a second scanned image (scanned image for one line).

Next, in the present exemplary embodiment, the two scanned images are gray scaled.

Thereafter, two output values for an identical pixel are obtained from the two scanned images. In other words, two output values are obtained for each of identical pixels.

More specifically, both the output value output from the light receiving element 32A in the case where the light is irradiated from the third light source 83 and the output value output from the light receiving element 32A in the case where the light is irradiated from the fourth light source 84 are obtained for the identical pixel.

The CPU 111 generates a correction parameter based on the two output values.

Specifically, the CPU 111 generates the correction parameter such that the two output values are closer to each other.

More specifically, the CPU 111 generates this correction parameter corresponding to each of the plurality of light receiving elements 32A, associates the correction parameter with the corresponding light receiving element 32A, and then registers the correction parameter in a memory (not shown).

In the present exemplary embodiment, as described above, in a case where two output values are obtained in each of the plurality of light receiving elements 32A, the correction parameter registered in association with the light receiving element 32A is read and acquired. The two output values obtained by the light receiving element 32A are corrected using this correction parameter.

Accordingly, two output values that are not affected by the formed angle are obtained.

Thereafter, the CPU 111 grasps the normal angle (main scanning direction component) based on the two corrected output values by the method described above (the method using spline interpolation or the like).

Here, the normal angle is grasped based on the two corrected output values by using the spline interpolation or the like, but the present invention is not limited thereto. The normal angle may be grasped based on a ratio of the two corrected output values.

For example, the CPU 111 grasps that the normal angle is 0° in a case where the ratio of the two corrected output values is 50:50. In a case where the ratio of the two corrected output values is other than 50:50, the CPU 111 grasps a value other than 0° as the normal angle.

Output of Inclination Information

As described above, the CPU 111 acquires the component of the normal angle in the sub-scanning direction (sub-scanning direction component) and the component of the normal angle in the main scanning direction (main scanning direction component).

Next, the CPU 111 acquires a tangent vector Nx=(1, 0, X') in the sub-scanning direction based on the sub-scanning direction component. The CPU 111 acquires a tangent vector Ny=(0, 1, Y') in the main scanning direction based on the main scanning direction component.

Next, the CPU 111 obtains an outer product of the two tangent vectors to obtain a three-dimensional normal vector N.

In the present exemplary embodiment, the CPU 111 further calculates the norm of the three-dimensional normal vector N to normalize the three-dimensional normal vector N (n=N/|N|). Next, each component of n is added by 1, divided by 2, and further multiplied by 255, and the CPU 111 obtains a value corresponding to each of XYZ components.

The CPU 111 outputs this value (three values) corresponding to each of the XYZ components in the data format in which the three values are arranged.

In the present exemplary embodiment, the inclination information is output in the data format in which three values are arranged, as described above. More specifically, in the present exemplary embodiment, the inclination information is output in the data format used in the case where the color information is output.

In the present exemplary embodiment, the image reading apparatus 1 acquires the color information which is information about the color of the measurement target, and this color information is output from the image reading apparatus 1 in the predetermined data format, as described above.

In the present exemplary embodiment, the inclination information is output in the predetermined data format used in the case where the color information is output.

More specifically, in the present exemplary embodiment, the color information is output in the data format in which three consecutive values of RBG are arranged. In the present exemplary embodiment, the inclination information is also output in the format in which three values are arranged.

More specifically, in outputting the inclination information, the inclination information is output in a format in which three values, the X component (component of the normal angle in the sub-scanning direction), the Y component (component of the normal angle in the main scanning direction), and the Z component (component of the normal angle in a direction orthogonal to both the main scanning direction and the sub-scanning direction), are arranged.

As described above, in a case where the inclination information is output in the data format used in the case where the color information is output, another computer that acquires the inclination information can display a degree of inclination of each of the specific places 40 in different colors without preparing special software.

In other words, in the case where the inclination information is output in the data format used in the case where the color information is output, another computer that acquires the inclination information can display a normal map without preparing special software.

More specifically, another computer that acquires the inclination information can display the degree of inclination of each of the specific places 40 in the colors by using software that visually displays the color of each pixel based on the RBG value.

Series of Flow of Turn-on Processing (A) to (D) of FIG. 8 are views of a series of flow of turn-on processing of the light sources provided in the reading unit 12.

In the processing of the present exemplary embodiment, first, the reading unit 12 is moved in the sub-scanning direction in the state where the first point light source row 16 is turned on, as shown in (A) of FIG. 8. Accordingly, the specific place 40 is irradiated with the light from the left side in the drawing.

Next, in the present exemplary embodiment, the reading unit 12 is moved in the sub-scanning direction in the state where the second point light source row 18 is turned on, as shown in (B) of FIG. 8. Accordingly, the specific place 40 is irradiated with the light from the right side in the drawing.

In the present exemplary embodiment, the specific place 40 is irradiated with the light in order from a plurality of places having different positions in one direction as indicated by an arrow 8X (refer to (A) and (B) of FIG. 8), as described above.

More specifically, in the present exemplary embodiment, the first point light source 16A and the second point light source 18B having different positions in one direction are substantially provided, and the first point light source 16A and the second point light source 18B are turned on in order to perform the irradiation of the light to the specific place 40 in order from the plurality of places having different positions in one direction.

Next, in the present exemplary embodiment, the reading unit 12 is moved in the sub-scanning direction in the state where the third light source 83 is turned on, as shown in (C) of FIG. 8. Accordingly, for example, the specific place 40 is irradiated with the light from an upper side in the drawing.

Next, in the present exemplary embodiment, the reading unit 12 is moved in the sub-scanning direction in the state where the fourth light source 84 is turned on, as shown in (D) of FIG. 8. Accordingly, for example, the specific place 40 is irradiated with the light from a lower side in the drawing.

In a case where the third light source 83 and the fourth light source 84 are turned on in order, the specific place 40 is irradiated with the light in order from a plurality of places having different positions in a direction (direction indicated by an arrow 8Y) intersecting (orthogonal) with the one direction (direction indicated by arrow 8X).

In the present exemplary embodiment, the third light source 83 and the fourth light source 84 having different positions in the direction intersecting with the one direction are provided.

In the present exemplary embodiment, the third light source 83 and the fourth light source 84 are turned on in order. Accordingly, the specific place 40 is irradiated with the light in order from the plurality of places having different positions in the intersecting direction.

With the turn-on processing, in the present exemplary embodiment, the specific place 40 is irradiated with the light from four different directions.

Thereafter, in the present exemplary embodiment, the sub-scanning direction component and the main scanning direction component are acquired for each of the specific places 40, as described above. As described above, the three-dimensional normal vector N is obtained based on the sub-scanning direction component and the main scanning direction component.

In the present exemplary embodiment, the case where the light sources are turned on in the order of the first point light source row 16, the second point light source row 18, the third light source 83, and the fourth light source 84 has been described as an example. However, the turn-on of the light sources is not limited thereto, and the light sources may be turned on in any other order.

For example, the third light source 83 and the fourth light source 84 may be turned on in order first, and the first point light source row 16 and the second point light source row 18 may be turned on in order later.

One point light source row of the first point light source row 16 and the second point light source row 18 may be turned on, then one light source of the third light source 83 and the fourth light source 84 may be turned on, then the other point light source row of the first point light source row 16 and the second point light source row 18 may be turned on, and then the other light source of the third light source 83 and the fourth light source 84 may be turned on.

One light source of the third light source 83 and the fourth light source 84 may be turned on, then one point light source row of the first point light source row 16 and the second point light source row 18 may be turned on, then the other light source of the third light source 83 and the fourth light source 84 may be turned on, and then the other point light source row of the first point light source row 16 and the second point light source row 18 may be turned on.

Another Configuration Example

FIG. 9 is a view of another configuration example of the reading unit 12.

In this configuration example, a side part 206 of the installation place of the third light source 83 (hereinafter, may be referred to as "third place 203"), which is located on a side opposite to an installation side of the fourth light source 84 across the third place 203, is provided with a first mirror M1 as an example of a light reflection member.

The first mirror M1 reflects the light from the third light source 83 toward the support surface 11D side and toward the third light source 83 side.

In this configuration example, a side part 207 of the installation place of the fourth light source 84 (hereinafter, may be referred to as "fourth place 204"), which is located on a side opposite to an installation side of the third light source 83 across the fourth place 204, is provided with a second mirror M2 as an example of the light reflection member.

The second mirror M2 reflects the light from the fourth light source 84 toward the support surface 11D side and toward the fourth light source 84 side.

As described above, in a case where the mirrors (first mirror M1 and second mirror M2) are provided on the side parts of the installation places of the light sources, the number of specific places 40 from which the main scanning direction component can be acquired can be increased.

In the present exemplary embodiment, in a case where the specific place 40 needs to be irradiated with the light from diagonally below and the first mirror M1 and the second mirror M2 are not provided, for example, the main scanning direction component can be obtained for the specific place 40 located in a region indicated by a reference numeral 9A.

On the contrary, in a case where the first mirror M1 and the second mirror M2 are provided as in the present exemplary embodiment, for example, a place indicated by a reference numeral 9B can be also irradiated with the light from diagonally below and thus the main scanning direction component can be also acquired for the specific place 40 located in the place indicated by the reference numeral 9B.

In FIG. 9, the case where the mirrors are provided on both the side part of the third light source 83 and the side part of the fourth light source 84 has been described as an example. However, the mirror may be provided on only one side part of the side part of the third light source 83 and the side part of the fourth light source 84.

Another Configuration Example

FIG. 10 is a view of another configuration example of the reading unit 12.

In this configuration example, a plurality of light sources having different positions in the main scanning direction are provided at each of the third place 203 and the fourth place 204. In other words, in this configuration example, the light sources are added inside the third light source 83 and the fourth light source 84 shown in FIG. 4.

More specifically, in the present exemplary embodiment, a first additional light source 83A is provided inside the third light source 83, and a second additional light source 84A is provided inside the fourth light source 84.

In this configuration example, in a case where the specific place 40 which is located on the third place 203 side and is located in a region indicated by a reference numeral 10A is irradiated with the light, the third light source 83 and the second additional light source 84A are turned on in order.

In this configuration example, in a case where the specific place 40 which is located on the fourth place 204 side and is located in a region indicated by a reference numeral 10B is irradiated with the light, the fourth light source 84 and the first additional light source 83A are turned on in order.

In a case where the specific place 40 located at an intermediate position between the third place 203 and the fourth place 204 is irradiated with the light, the third light source 83 and the fourth light source 84 are turned on.

In the present exemplary embodiment, for the specific place 40 that is closer to one light source side of the third light source 83 and the fourth light source 84, an angle formed by the optical path of the light from the other light source toward the specific place 40 and the support surface 11D is decreased. In a case where this angle is too small, the acquisition accuracy of the main scanning direction component may decrease.

On the contrary, in a case where the additional light source located on a side opposite to the side to which the specific place 40 is closer is turned on as in the present exemplary embodiment, the decrease in the formed angle is suppressed, and thus the decrease in the acquisition accuracy of the component in the main scanning direction may be suppressed.

In the present exemplary embodiment, the case where the additional light source is provided at each of the installation places of the third light source 83 and the fourth light source 84 has been described. However, the additional light source may be provided only at one installation place of the third light source 83 and the fourth light source 84.

Another Configuration Example

FIG. 11 is a view of another configuration example of the scanner apparatus 10. FIG. 11 shows a state in a case where an upper surface of the scanner apparatus 10 is viewed from a direction indicated by an arrow XI in FIG. 1.

In this configuration example, a reference member 300 disposed along the movement direction of the reading unit 12 (not shown in FIG. 11), which is an example of the movement body, is provided.

The reference member 300 is attached to an inner surface of the apparatus frame 14. In this configuration example, the reference member 300 is located in a reading region 32X along the main scanning direction by the sensor 32 and is read by the sensor 32 (refer to FIG. 3).

A part of the reference member 300 read by the sensor 32 is white.

In a case where the reference member 300 is read by the sensor 32, the reference member 300 is irradiated with the light by the light source row and the light source provided in the reading unit 12.

More specifically, in the present exemplary embodiment, in a case where the specific place 40 is irradiated with the light, the first point light source row 16, the second point light source row 18, the third light source 83, and the fourth light source 84 are turned on in order. In a case where this turn-on is performed, the reference member 300 is irradiated with the light from each of the light source row and the light source, as described above. In this case, reflected light from the reference member 300 is directed to the sensor 32.

The reference member 300 is used for grasping the fluctuation of the light emitted from the light source row and the light source.

In the present exemplary embodiment, the reading unit 12 is moved a plurality of times as shown in (A) to (D) of FIG. 8, and the reference member 300 is read in addition to the measurement target each time the reading unit 12 is moved.

In this configuration example, an output value (output value used for grasping the normal angle) output from each of the light receiving elements 32A is corrected based on a result of reading the reference member 300.

Specifically, in the present exemplary embodiment, the fluctuation of a color and an amount of the light emitted from each of the light source row and the light source is grasped from the result of reading the reference member 300, and the output value output from each of the light receiving elements 32A is corrected such that the influence of this fluctuation on the reading of the specific place 40 is decreased.

Accordingly, the fluctuation of the output value according to the position of the reading unit 12 in the sub-scanning direction is suppressed, and thus the decrease in the acquisition accuracy of the sub-scanning direction component and the main scanning direction component due to this fluctuation may be suppressed.

Second Exemplary Embodiment (A) to (D) of FIG. 12 are views of a basic processing flow according to a second exemplary embodiment.

In this exemplary embodiment, the third light source 83 and the fourth light source 84 are not provided.

In this exemplary embodiment, the reading unit 12 is moved in the sub-scanning direction, similarly to the above, in a state where one point light source 98 included in the first point light source row 16 is turned on, as shown in (A) of FIG. 12.

Accordingly, the specific place 40 is irradiated with the light from an upper left direction of the specific place 40, as shown in (A) of FIG. 12.

Next, as shown in (B) of FIG. 12, the reading unit 12 is moved in the sub-scanning direction in a state where another one point light source 98 included in the first point light source row 16 is turned on. Accordingly, the specific place 40 is irradiated with the light from the lower left direction of the specific place 40.

Next, the reading unit 12 is moved in the sub-scanning direction in a state where one point light source 98 included in the second point light source row 18 is turned on, as shown in (C) of FIG. 12. Accordingly, the specific place 40 is irradiated with the light from an upper right direction of the specific place 40.

In a case where positions in the main scanning direction are compared, a position of the one point light source 98 (point light source 98 indicated by a reference numeral 12A in (A) of FIG. 12) included in the first point light source row 16 coincides with a position of the one point light source 98 included in the second point light source row 18.

Next, the reading unit 12 is moved in the sub-scanning direction in a state where another one point light source 98 included in the second point light source row 18 is turned on, as shown in (D) of FIG. 12. Accordingly, the specific place 40 is irradiated with the light from the lower right direction of the specific place 40.

In a case where positions in the main scanning direction are compared, a position of the another one point light source 98 (the point light source 98 indicated by a reference numeral 12B in (B) of FIG. 12) included in the first point light source row 16 coincides with a position of another one point light source 98 included in the second point light source row 18.

In a case where total reflection is likely to occur inside each of the first point light source row 16 and the second point light source row 18 in the irradiation of the light to the specific place 40 from the point light sources 98 included in the first point light source row 16 and the second point light source row 18, the light from the diagonal direction toward the specific place 40 is less likely to be irradiated.

Specifically, in a case where the total reflection is likely to occur inside each of the first point light source row 16 and the second point light source row 18, the light along the sub-scanning direction is mostly emitted from each of the first point light source row 16 and the second point light source row 18 and the light from the diagonal direction toward the specific place 40 is less likely to be emitted.

More specifically, in each of the first point light source row 16 and the second point light source row 18, a transparent guide member (not shown) may be provided to guide the light on the optical path of the light from the point light source 98 toward the specific place 40, which is a position facing the point light source 98.

In a case where such a guide member is provided, the total reflection occurs on a surface of the guide member facing the point light source 98 side, the light from the diagonal direction toward the specific place 40 is less likely to be emitted.

In a case where the total reflection is likely to occur in this manner, removal of the guide member, attachment of a moth-eye film, installation of a light control film (LCF), or the like is, for example, preferable to prevent the total reflection from occurring.

Also in this exemplary embodiment, the CPU 111 turns on in order one point light source 98 included in the first point light source row 16 (hereinafter, referred to as "first point light source 98A") and the another one point light source 98 included in the second point light source row 18 (hereinafter, referred to as "second point light source 98B"), as shown in (A) and (D) of FIG. 12.

Accordingly, the specific place 40 is irradiated with the light in order from a plurality of places having different positions in one direction indicated by a reference numeral 12X in (A) and (D) of FIG. 12.

In the present exemplary embodiment, the "one direction" is a direction intersecting both the sub-scanning direction and the main scanning direction.

The CPU 111 turns on in order the another one point light source 98 included in the first point light source row 16 (hereinafter, referred to as "third point light source 98C") and the one point light source 98 included in the second point light source row 18 (hereinafter, referred to as "fourth point light source 98D").

Accordingly, the specific place 40 is irradiated with the light in order from a plurality of places having different positions in the direction intersecting with the one direction.

The positions of the first point light source 98A included in the first point light source row 16 and the second point light source 98B included in the second point light source row 18 are different from each other in the main scanning direction.

In the present exemplary embodiment, the third point light source 98C is located closer to the second point light source 98B than the first point light source 98A in the main scanning direction. The fourth point light source 98D is located closer to the first point light source 98A than the second point light source 98B in the main scanning direction.

The CPU 111 according to the present exemplary embodiment turns on the first point light source 98A and the second point light source 98B in order and irradiates the specific place 40 with the light in order from a plurality of places having different positions in one direction.

The CPU 111 turns on in order the third point light source 98C located closer to the second point light source 98B than the first point light source 98A and the fourth point light source 98D located closer to the first point light source 98A than the second point light source 98B and irradiates the specific place 40 with the light in order from a plurality of places having different positions in a direction intersecting with the one direction.

Accordingly, the specific place 40 can be irradiated with the light from four directions also in this case, and two sets of two output values can be obtained, similarly to the above.

In this case, a component corresponding to the sub-scanning direction component can be acquired based on the two output values of a first set and a component corresponding to the main scanning direction component can be acquired based on the two output values of a second set, similarly to the above.

In the basic processing shown in (A) to (D) of FIG. 12, the case has been described in which only one point light source 98 is turned on in turning on once each of the first point light source row 16 and the second point light source row 18.

From a viewpoint of efficiency, the turn-on of a plurality of point light sources 98 is, for example, more preferable in each of the first point light source row 16 and the second point light source row 18.

Specifically, the turn-on of the plurality of point light sources 98 is, for example, preferable in a case where each of the first point light source row 16 and the second point light source row 18 is turned on, as shown in (A) and (B) of FIG. 13 (views of other turn-on states of the light source) and in (C) and (D) of FIG. 14 (views of other turn-on states of the light source).

In the examples shown in (A) and (B) of FIGS. 13 and (C) and (D) of FIG. 14, a plurality of specific places 40 are set.

The plurality of specific places 40 are set so as to have different positions in the main scanning direction as shown in (A) of FIG. 13.

In this case, in first turn-on, the CPU 111 alternately turns on point light sources 98 included in the first point light source row 16 as shown in (A) of FIG. 13. Accordingly, in this case, each of the specific places 40 is irradiated with the light from the upper left direction or the lower left direction.

Next, in second turn-on, the CPU 111 alternately turns on point light sources 98, different from the point light sources 98 that have been turned on at the time of the first turn-on, among the point light sources 98 included in the first point light source row 16 as shown in (B) of FIG. 13.

More specifically, in this case, the CPU 111 turns on point light sources 98 located between the point light sources 98 that have been turned on at the time of the first turn-on.

Accordingly, in this case, each of the specific places 40 is irradiated with the light from the upper left direction or the lower left direction. More specifically, in this case, the specific place 40 is irradiated with the light from the direction different from the irradiation direction at the time of the first turn-on, which is the upper left direction or the lower left direction.

Next, the CPU 111 performs third turn-on. In the third turn-on, the point light sources 98 included in the second point light source row 18 are alternately turned on, as shown in (C) of FIG. 14. Accordingly, in this case, each of the specific places 40 is irradiated with the light from the upper right direction or the lower right direction.

Next, the CPU 111 performs fourth turn-on. In the fourth turn-on, point light sources 98, different from the point light sources 98 that have been turned on at the time of the third turn-on, are alternately turned on, as shown in (D) of FIG. 14. More specifically, in this case, the CPU 111 turns on point light sources 98 located between the point light sources 98 that have been turned on at the time of the third turn-on.

Accordingly, in this case, each of the specific places 40 is irradiated with the light from the upper right direction or the lower right direction. More specifically, in this case, the specific place 40 is irradiated with the light from the direction different from the irradiation direction at the time of the third turn-on, which is the upper right direction or the lower right direction.

Accordingly, each of the specific places 40 is irradiated with the light from four directions also in this irradiation example.

Also in the examples shown in (A) and (B) of FIGS. 13 and (C) and (D) of FIG. 14, the turn-on of the plurality of point light sources 98 included in the first point light source row 16 and the turn-on of the plurality of point light sources 98 included in the second point light source row 18 are performed in order, and each of the plurality of specific places 40 is irradiated with the light from a plurality of places having different positions in one direction (direction indicated by an arrow 13X), as shown in (A) of FIGS. 13 and (D) of FIG. 14.

The "one direction" is a direction intersecting both the main scanning direction and the sub-scanning direction.

In the examples shown in (A) and (B) of FIGS. 13 and (C) and (D) of FIG. 14, the turn-on of a plurality of other point light sources 98 different from the plurality of point light sources 98 included in the first point light source row 16 and the turn-on of a plurality of other point light sources 98 different from the plurality of point light sources 98 included in the second point light source row 18 are performed in order, as shown in (B) of FIGS. 13 and (C) of FIG. 14.

Accordingly, each of the plurality of specific places 40 is irradiated with the light from a plurality of places having different positions in a direction intersecting the one direction.

Accordingly, each of the plurality of specific places 40 is irradiated with the light from four directions also in this case.

In a case where specific places 40 that have not been irradiated with the light from the four directions remain after the four times of turn-on of the light source, point light sources 98 that have not been turned on are further turned on to irradiate with the light each of the specific places 40 that have not been irradiated with the light from the four directions.

Meanwhile, depending on a positional relationship between the specific place 40 and the two point light sources 98 that irradiate the specific place 40 with the light, for example, the specific place 40 may not be located on a line connecting the two point light sources 98 and the two output values may differ from each other due to the location of the specific place 40, similarly to the above.

In other words, even in a case where the surface 40A of the specific place 40 is along the horizontal direction, the two output values may differ from each other depending on the positional relationship between the specific place 40 and the two point light sources 98.

FIG. 15 is a view of a state in a case where light sources and a specific place are viewed from above.

In the configuration of the present exemplary embodiment, the specific place 40 may not be located on a line connecting the two point light sources 98, as shown in FIG. 15.

In this case, an angle θ formed by a first orientation 17A in a case where the first point light source 98A is viewed from a perpendicular line 17E and a second orientation 17B in a case where the second point light source 98B is viewed from a perpendicular line 17E is other than 180°.

More specifically, in a case of assuming the perpendicular line 17E with respect to the support surface 11D (refer to FIG. 3) and passing through the specific place 40, the angle θ formed by the orientation 17A in the case where the first point light source 98A is viewed from the perpendicular line 17E and the orientation 17B in the case where the second point light source 98B is viewed from the perpendicular line 17E is other than 180°.

In this case, similarly, an angle formed by an orientation in a case where the third point light source 98C is viewed from the perpendicular line 17E and an orientation in a case where the fourth point light source 98D is viewed from the perpendicular line 17E is also other than 180°.

In this case, the two output values may differ from each other.

Therefore, also in this case, the two output values are, for example, preferably corrected, similarly to the above.

That is, in a case where the angle θ formed by the orientation in the case where the first point light source 98A is viewed from the perpendicular line 17E and the orientation in the case where the second point light source 98B is viewed from the perpendicular line 17E is other than 180°, the two output values output from the light receiving element 32A are, for example, preferably corrected.

Similarly, in a case where the angle formed by the orientation in the case where the third point light source 98C is viewed from the perpendicular line 17E and the orientation in the case where the fourth point light source 98D is viewed from the perpendicular line 17E is other than 180°, the two output values output from the light receiving element 32A are, for example, preferably corrected.

More specifically, in this case, the two output values obtained by the light receiving element 32A are, for example, preferably corrected by associating the correction parameter with each of the light receiving element 32A.

In generating the correction parameter, the output value of the light receiving element 32A in a case where the reference plate 71 is read in the state where a first point light source 98 is turned on is obtained, similarly to the above. The output value of the light receiving element 32A in a case where the reference plate 71 is read in the state where a second point light source 98, located on a side opposite to the first point light source 98 across the specific place 40, is turned on is obtained.

The correction parameter is generated such that the two output values are close to each other based on the obtained two output values. The correction parameter is registered in a state of being associated with the light receiving element 32A.

More specifically, also in this exemplary embodiment, two sets of two output values can be obtained from one light receiving element 32A. In the present exemplary embodiment, the correction parameter is generated based on the two output values of a first set in a case where the reference plate 71 is read, and the correction parameter is associated with the light receiving element 32A and the two point light sources 98 that are turned on in a case where the two output values are obtained.

The correction parameter is generated based on the two output values of a second set in a case where the reference plate 71 is read, and the correction parameter is associated with the light receiving element 32A and the two point light sources 98 that are turned on in a case where the two output values are obtained.

Third Exemplary Embodiment (A) and (B) of FIG. 16 are views of turn-on processing of light sources in a third exemplary embodiment. Also in the third exemplary embodiment, the third light source 83 and the fourth light source 84 are not provided as in the second exemplary embodiment.

Each of (A) and (B) of FIG. 16 shows a state in which one point light source 98 is turned on. However, in the present exemplary embodiment, all the point light sources 98 included in each of the first point light source row 16 and the second point light source row 18 are turned on in a case where the first point light source row 16 and the second point light source row 18 are turned on.

Accordingly, in this case, each of the plurality of specific places 40 arranged in the main scanning direction is irradiated with the light along the sub-scanning direction. In other words, only one specific place 40 is displayed in (A) and (B) of FIG. 16. However, each of the plurality of specific places 40 is actually irradiated with the light along the sub-scanning direction.

In this exemplary embodiment, the CPU 111 moves the reading unit 12 in a state where the first point light source row 16 is turned on, as shown in (A) of FIG. 16. Next, as shown in (B) of FIG. 16, the CPU 111 moves the reading unit 12 in a state where the second point light source row 18 is turned on.

In the present exemplary embodiment, the CPU 111 acquires the sub-scanning direction component for each of the specific places 40 by the method described above.

In the present exemplary embodiment, a light guide member 500 is provided between the first point light source row 16 and the specific place 40 and is provided between the second point light source row 18 and the specific place 40, as shown in (A) and (B) of FIG. 16.

The light guide member 500 guides the light such that only the light having the component along the sub-scanning direction, of the light emitted from the first point light source row 16 and the second point light source row 18, directs to the specific place 40.

As described above, in a case where the light guide member 500 is provided, the light having the component along the main scanning direction is less likely to be directed to the specific place 40 and thus the acquisition accuracy of the sub-scanning direction component is improved.

The light guide member 500 is configured of, for example, a light control film (LCF) or a Fresnel lens having curvatures on both sides. The light guide member 500 is not always necessary and may be omitted.

FIG. 17 is a view in a case where the measurement target on the support surface 11D is viewed from a direction indicated by an arrow XVII in FIG. 1.

In a case where the sub-scanning direction component for each of the specific places 40 is acquired, the CPU 111 acquires height information for each of the specific places 40 based on the acquired sub-scanning direction component.

More specifically, as shown in FIG. 17, the CPU 111 acquires the height information for each of the specific places 40 included in each row R, for each row R in which a plurality of specific places 40 are arranged along the sub-scanning direction.

More specifically, the CPU 111 acquires the height information for each of the specific places 40 included in each row R for each row R based on the sub-scanning direction component obtained for each of the specific places 40.

More specifically, a first row R1, a second row R2, and a third row R3 are displayed in FIG. 17, and the information about the height of each of the specific places 40 included in each row is acquired for each of the rows R.

FIG. 18 is a graph showing the height for each of the specific places 40 in a case where the first row R1 and the second row R2 are viewed from a direction indicated by an arrow XVIII in FIG. 17.

In the present exemplary embodiment, information about an inclination of each of the specific places 40 can be obtained as indicated by a reference numeral 18A in the drawing. More specifically, in the present exemplary embodiment, the sub-scanning direction component is obtained as the information about the inclination of each of the specific places 40.

In the present exemplary embodiment, the CPU 111 grasps the height of each part (each specific place 40) configuring the surface of the measurement target using the sub-scanning direction component.

Specifically, in a case where a direction specified by the sub-scanning direction component for the specific place 40 is diagonally toward the upper left direction as indicated by a reference numeral 18B, the CPU 111 grasps that a specific place 40 (hereinafter, referred to as "right adjacent place 40F") located one next to the specific place 40 (hereinafter, referred to as "left adjacent place 40E") is higher than the left adjacent place 40E.

In this case, the CPU 111 grasps an inclination angle of the left adjacent place 40E based on the sub-scanning direction component and grasps a specific height of the right adjacent place 40F based on the inclination angle.

More specifically, the CPU 111 grasps the inclination angle of the left adjacent place 40E based on the sub-scanning direction component and grasps a height difference between the left adjacent place 40E and the right adjacent place 40F based on this inclination angle. The CPU 111 adds this height difference to the height of the left adjacent place 40E to grasp the specific height of the right adjacent place 40F.

The CPU 111 performs this processing in order from a leftmost specific place 40 (specific place 40 located at "position 1") in FIG. 17 toward the right direction for each row R to acquire the height information of each of the specific places 40.

In other words, the CPU 111 grasps the height of each of the specific places 40 from a left end toward the right of each row R for each row R along the sub-scanning direction.

More specifically, the CPU 111 performs integration processing based on the information about the inclination of the specific place 40 for each row R, in which the specific places 40 are arranged along the sub-scanning direction, to sequentially acquire the information about the height of each of the specific places 40 included in each row.

More specifically, for example, with a part of a side edge 600 (refer to FIG. 17) of the measurement target as a reference for height, the CPU 111 sets the reference height to, for example, zero.

The CPU 111 acquires the information about the height of each of the specific places 40 arranged in a direction away from this reference with zero as the reference, based on the sub-scanning direction component.

The reference for height is not limited to the side edge 600. The information about the height of each of the specific places 40 arranged in the direction away from this reference may be acquired with the white reference plate 71 (refer to FIG. 1) provided below the guide member 68 as the reference for height, based on the sub-scanning direction component.

In a case where the reference plate 71 is used as the reference for height, a height at a place where the reference plate 71 is provided is set to, for example, zero. A height difference (height difference obtained based on the sub-scanning direction component) obtained for each of the specific places 40 arranged in the direction away from this reference is sequentially added to zero to acquire the information about the height for each of the specific places 40.

The example shown in FIG. 18 illustrates a case where the height of each of three specific places 40, which are included in the first row R1 (refer to also FIG. 17), arranged in the right direction from the specific place 40 located at the leftmost end is grasped.

The example shown in FIG. 18 illustrates a case where the height of each of three specific places 40 included in the second row R2 (refer to also FIG. 17), which is a row located next to the first row R1 in the main scanning direction, is grasped.

Thereafter, in the present exemplary embodiment, the CPU 111 acquires information about an inclination of a surface of a part (hereinafter, referred to as "inter-part part 450") located between two specific places 40 adjacent to each other in the main scanning direction (refer to FIG. 17) based on the height of each of the two specific places 40, as shown by a reference numeral 19A in FIG. 19 (a graph describing processing executed in a case where the main scanning direction component is acquired).

In other words, the CPU 111 acquires the information corresponding to the main scanning direction component for the inter-part part 450 located between the two specific places 40, based on the height of each of the two specific places 40 adjacent to each other in the main scanning direction.

More specifically, in acquiring this information corresponding to the main scanning direction component, the CPU 111 first obtains a difference in height between the two specific places 40 adjacent to each other in the main scanning direction and a separation distance (separation distance in a direction orthogonal to a height direction) of the two specific places 40.

The CPU 111 acquires a value obtained by dividing the difference in height by the separation distance as the information corresponding to the main scanning direction component for the inter-part part 450.

The CPU 111 acquires similarly the information corresponding to the main scanning direction component (hereinafter, simply referred to as "main scanning direction component") for each of the inter-part parts 450 located at other places.

For example, assuming that a part indicated by a reference numeral 17G in FIG. 17 (an example of the specific part) is the specific place 40 for which the main scanning direction component is acquired, the CPU 111 grasps main scanning direction components for two inter-part parts 450 (two inter-part parts 450 indicated by reference numerals 17E and 17F) located on both sides of the specific place 40.

The CPU 111 obtains an average value of the grasped main scanning direction components (two main scanning direction components) and acquires the average value as the main scanning direction component of the specific place 40 indicated by the reference numeral 17G.

The average value of the main scanning direction components obtained for each of the two inter-part parts 450 is used as the main scanning direction component of the specific place 40 located between the two inter-part parts 450. However, the main scanning direction component of the specific place 40 is not limited to the average value.

In addition to the average value, for example, one main scanning direction component in the main scanning direction component of each of the two inter-part parts 450 may be associated with the specific place 40 to grasp only the one main scanning direction component as the main scanning direction component of the specific place 40.

As described above, in the present exemplary embodiment, the CPU 111 acquires the information about the height of each part, configuring the surface of the measurement target, arranged in one direction and acquires the information about the height of each part for each row in which each part is arranged in one direction.

In the present exemplary embodiment, the main scanning direction component is acquired for the specific place 40 indicated by the reference numeral 17G or the like, based on the information about the height of one part included in one row and the information about the height of other parts included in other rows.

The height of each of the specific places 40 may be corrected by using a least squares method or the like to reduce a height error. A new sub-scanning direction component and a new main scanning direction component may be acquired based on the height of each of the specific places 40 after the correction.

In the present exemplary embodiment, the main scanning direction component is obtained for each of the specific places 40 as described above. In this case, the main scanning direction component can be used to obtain the height of each of the specific places 40 for each row along the main scanning direction.

As a result, in the present exemplary embodiment, two heights can be obtained for the identical specific place 40. Specifically, the height obtained based on the sub-scanning direction component and the height obtained based on the main scanning direction component can be obtained.

In the present exemplary embodiment, calculation processing is performed by using the least squares method or the like such that the difference between the two heights is minimized to obtain the height of the specific place 40 in a case where the difference is minimized for each specific place 40.

A new sub-scanning direction component and a new main scanning direction component are acquired based on the height obtained for each specific place 40 (height of the specific place 40 in the case where the difference is minimized).

Accordingly, the normal angle obtained for each specific place 40 becomes more accurate.

In addition, for example, the information about the inclination of a specific place 40 at an intermediate position, which is a position between the two specific places 40, may be obtained based on the information about the height of each of two specific places 40 that are separated from each other in the main scanning direction.

More specifically, in this case, for example, the two specific places 40 that are separated from each other in the main scanning direction are assumed, as shown by reference numerals 17C and 17D in FIG. 17.

In this case, the height difference between the two specific places 40 is divided by the separation distance, and the value obtained by this division may be obtained as the information about the inclination of the specific place 40 (an example of the intermediate part) located between the two specific places 40 such as the specific place 40 indicated by the reference numeral 17G.

The "specific place 40 at the intermediate position" does not mean that the specific place 40 is located on a midpoint of a line segment connecting the two specific places 40, but means that the specific place 40 is located between the two specific places 40. Even a case where there is no specific place 40 on the midpoint corresponds to the "specific place 40 at the intermediate position".

Other

In the above, the processing of acquiring the inclination information has been mostly described. In this case, the color information is removed by grayscale or the like, and then the inclination information is acquired, as described above.

On the contrary, in a case where the color information of the measurement target is acquired, for example, the reading unit 12 is moved in a state where both the first point light source row 16 and the second point light source row 18 are turned on to read the measurement target.

That is, in a case where the color information of the measurement target is acquired, the scan for acquiring the color information is performed in the state where both the first point light source row 16 and the second point light source row 18 are turned on, separately from the scan for acquiring the inclination information.

More specifically, in the configuration shown in the first exemplary embodiment, the reading unit 12 is moved in the state where both the first point light source row 16 and the second point light source row 18 are turned on without turning on the third light source 83 and the fourth light source 84 to acquire the color information.

In the configuration shown in the second exemplary embodiment, the reading unit 12 is moved in the state where all the point light sources 98 included in the first point light source row 16 and the second point light source row 18 are turned on without performing the processing of turning on only a part of the point light sources 98 to acquire the color information.

Also in the configuration shown in the third exemplary embodiment, the reading unit 12 is moved in the state where all the point light sources 98 included in the first point light source row 16 and the second point light source row 18 are turned on to acquire the color information.

In a case where the reading is performed in the state where both the first point light source row 16 and the second point light source row 18 are turned on, a shadow that may occur on the measurement target can be suppressed and thus the decrease in reading accuracy due to the shadow can be suppressed.

A timing of reading for acquiring the color information is not particularly limited, and may be before or after reading for acquiring the normal information.

In the first exemplary embodiment described above, the four light sources are installed. In the second exemplary embodiment, the control to turn on only a part of the light sources is performed to irradiate the specific place 40 with the light from the four directions.

Meanwhile, the present invention is not limited thereto. For example, a light irradiator capable of irradiating the light from two directions may be rotated about a rotation axis orthogonal to the support surface 11D (refer to FIG. 3) to irradiate the specific place 40 with the light from the four directions.

For example, one light source may be moved around the rotation axis to irradiate the specific place 40 with the light from the four directions.

In the configuration example shown in (A) and (B) of FIG. 7, two output values, obtained in a case where the specific place 40 is irradiated with the light from each of the third place 203 and the fourth place 204 having different positions in the main scanning direction, have been corrected, but the correction of the two output values is not limited thereto.

For example, also in a case where the specific place 40 is irradiated with the light from each of a plurality of places having different positions in the sub-scanning direction, the two obtained output values may be corrected by the similar method as described above.

More specifically, the specific place 40 and the light receiving element 32A are assumed to be arranged in the sub-scanning direction in some cases. In this case, the formed angle becomes different depending on the positional relationship between the specific place 40 and the light source, and the two obtained output values may fluctuate, similarly to the above.

Also in a case where the specific place 40 is irradiated with the light from each of the plurality of places having different positions in the sub-scanning direction, the two obtained output values are corrected to improve the acquisition accuracy of the sub-scanning direction component.

In the case where the specific place 40 and the light receiving element 32A are arranged in the sub-scanning direction, the mirrors may be provided on one side part or both side parts of the two light sources arranged to have different positions in the sub-scanning direction, as in the configuration example shown in FIG. 9.

Accordingly, in this case, the specific place 40 can be irradiated with the light from diagonally below over a wider range in the sub-scanning direction.

In the case where the specific place 40 and the light receiving element 32A are arranged in the sub-scanning direction, the plurality of light sources having different positions in the sub-scanning direction may be installed in one or both of the installation place of each of the two light sources arranged so as to be offset from each other in the sub-scanning direction, as in the configuration example shown in FIG. 10.

In addition, a third point light source row 20 may be provided in the reading unit 12 in addition to the first point light source row 16 and the second point light source row 18, as shown in FIG. 20 (a view of another configuration example of the reading unit 12).

The third point light source row 20 is located on the downstream side of the specific place 40 in the movement direction of the reading unit 12 and irradiates light toward the specific place 40 located on the upstream side.

An angle $\theta 3$ formed by the perpendicular line 70 and an optical path R13 of the light from the third point light source row 20 toward the specific place 40 is 5°. The formed angle is not limited thereto and may be about 5° to 10°.

The image reading apparatus 1 including the reading unit 12 performs the movement of the reading unit 12 in the state where the third point light source row 20 is turned on, in addition to the movement of the reading unit 12 in the state where the first point light source row 16 is turned on and the movement of the reading unit 12 in the state where the second point light source row 18 is turned on.

Accordingly, in this case, the fitting may be performed based on each of output values (five output values) corresponding to five incident angles including "+5°" to improve the accuracy of grasping the normal angle.

In the above, the fitting has been performed based on each of the output values (four output values) corresponding to the four incident angles of −180°, −45°, +45°, and +180°. However, in a case where the third point light source row 20 is also turned on, the fitting may be performed based on each of the five output values to improve the accuracy of grasping the normal angle.

In a case where a light source having a relationship in which the angle formed with the perpendicular line 70 is small, such as the third point light source row 20, is installed, not only the normal map but also a specular map can be acquired.

Further, in a case where the reading unit 12 is moved in a state where both the first point light source row 16 and the second point light source row 18 are turned on, an albedo map can be also acquired. Accordingly, all the components except translucency can be acquired, and thus a complete apparatus is provided as an apparatus that generates a texture map.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A measurement apparatus comprising:
    a light irradiator that irradiates a measurement target with light; and
    a processor that controls the light irradiator,
    wherein the processor is configured to:
        irradiate a specific place of the measurement target with the light from a plurality of places having different positions in one direction; and
        irradiate the specific place of the measurement target with the light from a plurality of places having different positions in a direction intersecting the one direction, wherein
    a first light source and a second light source covering a majority of a reading unit having different positions in the one direction and a third light source and a fourth light source having different positions in the intersecting direction are provided, as the light irradiator,
    the first light source comprises a first point light source row and the second light source comprises a second point light source row, and
    in a sub-scanning direction, the third light source and the fourth light source are located between the first point light source row and the second point light source row.

2. The measurement apparatus according to claim 1, wherein the processor is configured to:
    turn on the first light source and the second light source in order to irradiate the specific place with the light from the plurality of places having different positions in the one direction; and
    turn on the third light source and the fourth light source in order to irradiate the specific place with the light from the plurality of places having different positions in the intersecting direction.

3. The measurement apparatus according to claim 1, further comprising:
    a support surface that supports the measurement target; and
    a light receiving section that receives reflected light from the specific place,
    wherein the processor is configured to:
        correct an output value output from the light receiving section in a case where an angle formed by light toward the specific place from a first place included in the plurality of places having different positions in the one direction and the support surface is different from an angle formed by light toward the specific place from a second place included in the plurality of places and the support surface; and/or
        correct an output value output from the light receiving section in a case where an angle formed by light toward the specific place from a third place included in the plurality of places having different positions in the intersecting direction and the support surface is different from an angle formed by light toward the specific place from a fourth place included in the plurality of places and the support surface.

4. The measurement apparatus according to claim 3, wherein the processor is configured to:
    increase an output value output from the light receiving section in a case where the specific place is irradiated with the light from a place where the formed angle is smaller of the first place and the second place and/or decrease an output value output from the light receiving section in a case where the specific place is irradiated with the light from a place where the formed angle is larger of the first place and the second place; and/or
    increase an output value output from the light receiving section in a case where the specific place is irradiated with the light from a place where the formed angle is smaller of the third place and the fourth place and/or decrease an output value output from the light receiving section in a case where the specific place is irradiated with the light from a place where the formed angle is larger of the first place and the second place.

5. The measurement apparatus according to claim 1, further comprising:
    a movement body that moves in the one direction,
    wherein the light irradiator is provided on the movement body, and
    a reference member which is disposed along the one direction, is irradiated with the light by the light irradiator provided on the movement body, and is used for grasping a fluctuation of the light emitted from the light irradiator is further provided.

6. The measurement apparatus according to claim 1, further comprising:
    a support surface that supports the measurement target,
    wherein a side part of at least one place of a first place or a second place included in the plurality of places having different positions in the one direction, which is located on a side opposite to a side where the other place is located across the one place, is further provided with a light reflection member that reflects light from a light source located at the one place toward the support surface side and toward the one place side, and/or
    a side part of at least one place of a third place or a fourth place included in the plurality of places having different positions in the intersecting direction, which is located on a side opposite to a side where the other place is located across the one place, is further provided with a light reflection member that reflects light from a light source located at the one place toward the support surface side and toward the one place side.

7. The measurement apparatus according to claim 1, wherein at least one place of a first place or a second place included in the plurality of places having different positions in the one direction is provided with a plurality of light sources having different positions in the one direction, and/or at least one place of a third place or a fourth place included in the plurality of places having different positions in the intersecting direction is provided with a plurality of light sources having different positions in the intersecting direction.

8. The measurement apparatus according to claim 1, wherein a first point light source row and a second point light source row arranged along a common direction are provided as the light irradiator, and the processor is configured to:
- turn on a first point light source included in the first point light source row and a second point light source included in the second point light source row in order to irradiate the specific place with the light from the plurality of places having different positions in the one direction; and
- turn on a third point light source included in the first point light source row and a fourth point light source included in the second point light source row in order to irradiate the specific place with the light from the plurality of places having different positions in the intersecting direction.

9. The measurement apparatus according to claim 8, wherein the processor is configured to:
- turn on the first point light source and the second point light source having different positions in the common direction in order to irradiate the specific place with the light from the plurality of places having different positions in the one direction; and
- turn on the third point light source located closer to the second point light source than the first point light source in the common direction and the fourth point light source located closer to the first point light source than the second point light source in the common direction in order to irradiate the specific place with the light from the plurality of places having different positions in the intersecting direction.

10. The measurement apparatus according to claim 1, wherein the first point light source row and the second point light source row arranged along a common direction are provided as the light irradiator, a plurality of specific places are set, the plurality of the specific places are arranged to have different positions in the common direction, and the processor is configured to:
- turn on a plurality of point light sources included in the first point light source row and a plurality of point light sources included in the second point light source row in order to irradiate each of the plurality of specific places with the light from a plurality of places having different positions in one direction; and
- turn on a plurality of other point light sources different from the plurality of point light sources included in the first point light source row and a plurality of other point light sources different from the plurality of point light sources included in the second point light source row in order to irradiate each of the plurality of specific places with the light from a plurality of places having different positions in a direction intersecting the one direction.

11. The measurement apparatus according to claim 8, further comprising:

a support surface that supports the measurement target; and a light receiving section that receives reflected light from the specific place, wherein the processor is configured to:
- correct an output value output from the light receiving section in a case where an angle formed by an orientation in a case where the first point light source is viewed from a perpendicular line perpendicular to the support surface and passing through the specific place and an orientation in a case where the second point light source is viewed from the perpendicular line is other than 180°; and/or
- correct an output value output from the light receiving section in a case where an angle formed by an orientation in a case where the third point light source is viewed from a perpendicular line perpendicular to the support surface and passing through the specific place and an orientation in a case where the fourth point light source is viewed from the perpendicular line is other than 180°.

* * * * *